United States Patent [19]
Gillick et al.

[11] Patent Number: 6,029,124
[45] Date of Patent: Feb. 22, 2000

[54] SEQUENTIAL, NONPARAMETRIC SPEECH RECOGNITION AND SPEAKER IDENTIFICATION

[75] Inventors: Laurence S. Gillick, Newton; Andrés Corrada-Emmanuel, Florence; Michael J. Newman, Somerville; Barbara R. Peskin, Arlington, all of Mass.

[73] Assignee: Dragon Systems, Inc., Newton, Mass.

[21] Appl. No.: 09/050,428

[22] Filed: Mar. 31, 1998

Related U.S. Application Data

[63] Continuation-in-part of application No. 08/804,061, Feb. 21, 1997, and application No. 08/807,430, Feb. 28, 1997
[60] Provisional application No. 60/075,997, Feb. 26, 1998.
[51] Int. Cl.[7] .................................................. G10L 9/00
[52] U.S. Cl. ........................................ 704/200; 704/231
[58] Field of Search .................................... 704/200, 240, 704/241, 245, 246, 238, 231, 250, 251

[56] References Cited

U.S. PATENT DOCUMENTS

| | | |
|---|---|---|
| 4,783,803 | 11/1988 | Baker et al. . |
| 4,805,218 | 2/1989 | Bamberg et al. . |
| 4,805,219 | 2/1989 | Baker et al. . |
| 4,817,158 | 3/1989 | Picheny . |
| 4,829,576 | 5/1989 | Porter . |
| 4,833,712 | 5/1989 | Bahl et al. . |
| 4,837,831 | 6/1989 | Gillick et al. ........................... 704/240 |
| 4,926,488 | 5/1990 | Nadas et al. . |
| 4,931,950 | 6/1990 | Isle et al. . |
| 5,027,406 | 6/1991 | Roberts et al. . |
| 5,036,538 | 7/1991 | Oken et al. . |
| 5,095,508 | 3/1992 | Fujimoto . |
| 5,202,952 | 4/1993 | Gillick et al. . |
| 5,271,088 | 12/1993 | Bahler . |
| 5,497,373 | 3/1996 | Hulen et al. . |
| 5,715,367 | 2/1998 | Gillick et al. ........................... 704/250 |
| 5,737,487 | 4/1998 | Bellegarda et al. ..................... 704/250 |
| 5,842,163 | 11/1998 | Weintraub ............................... 704/240 |

OTHER PUBLICATIONS

Gauvain, J.L. et al., "Experiments with Speaker Verification Over the Telephone," ESCA, Eurospeech '95, Madrid (Sep. 1995), pp. 651–654.

Mandel, Mark A. et al., "A Commercial Large–Vocabulary Discrete Speech Recognition System: DragonDictate," Language and Speech, vol. 35 (1,2) (1992), pp. 237–246.

Newman, Michael et al., "Speaker Verification Through Large Vocabulary Continuous Speech Recognition," Dragon Systems, Inc., Newton, MA.

*Primary Examiner*—David R. Hudspeth
*Assistant Examiner*—Susan Wieland
*Attorney, Agent, or Firm*—Fish & Richardson P.C.

[57] ABSTRACT

A speech sample is evaluated using a computer. Training data that include samples of speech are received and stored along with identification of speech elements to which portions of the training data are related. A speech sample is received and speech recognition is performed on the speech sample to produce recognition results. Finally, the recognition results are evaluated in view of the training data and the identification of the speech elements to which the portions of the training data are related. The technique may be used to perform tasks such as speech recognition, speaker identification, and language identification.

27 Claims, 17 Drawing Sheets

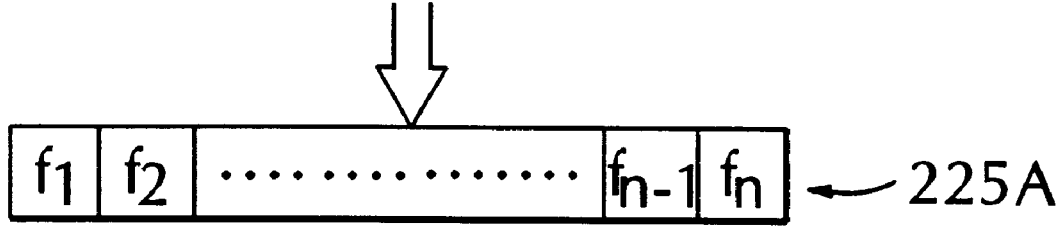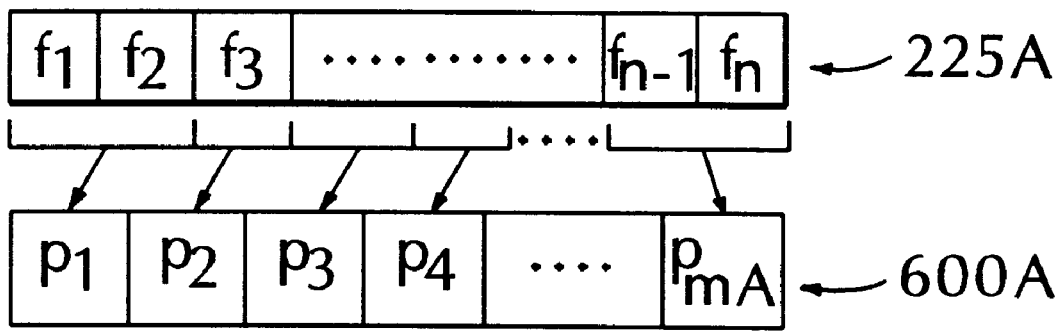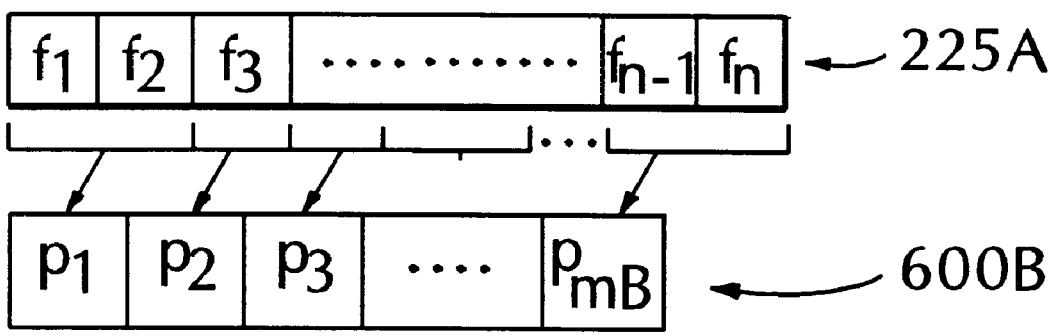
FIG. 6

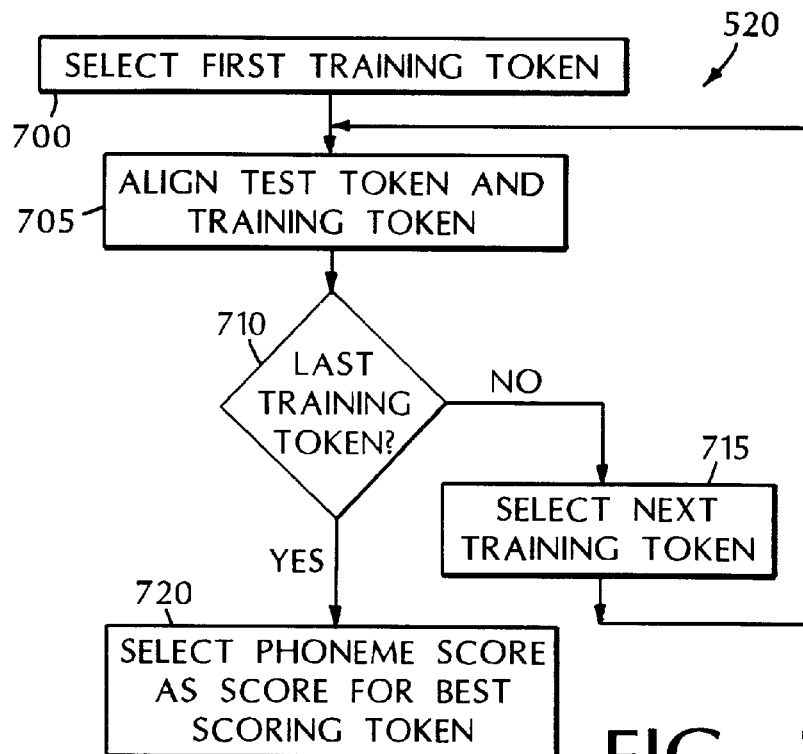
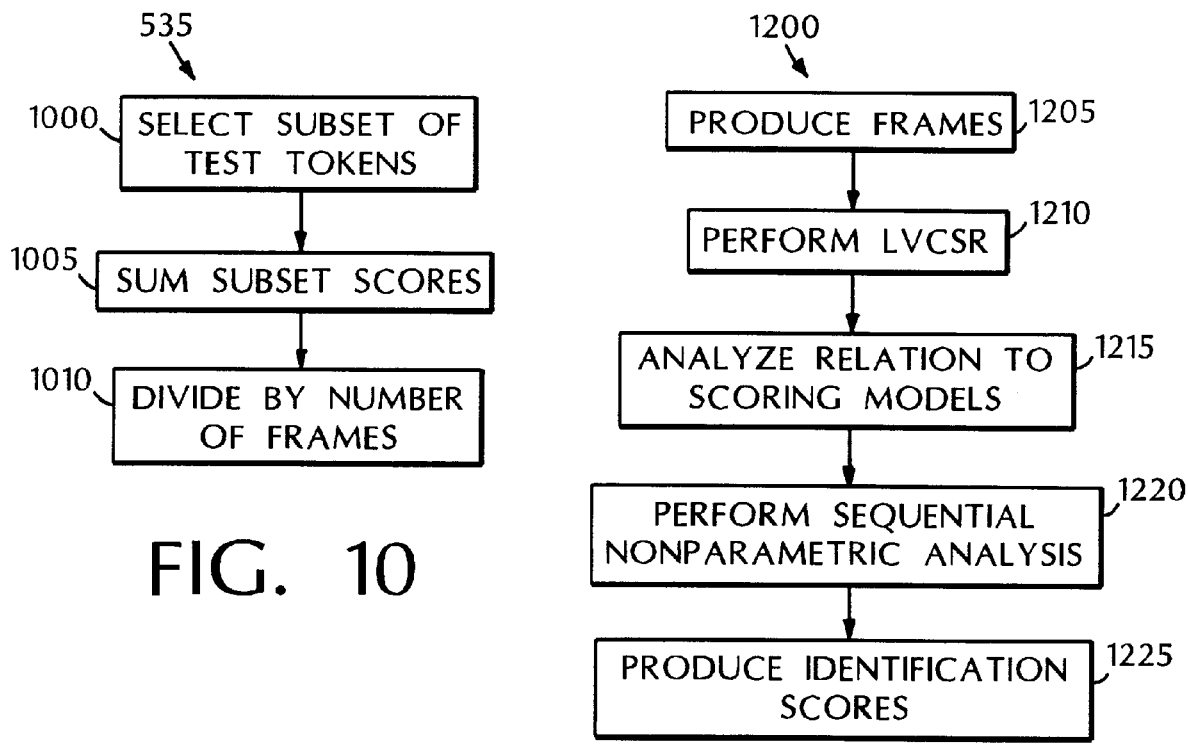

| 1900 | Word₁ | $P_1$ | $P_2$ | $P_3$ | $P_4$ | $P_5$ |
|---|---|---|---|---|---|---|
| 1900 | Word₂ | $P_1$ | $P_5$ | $P_7$ | | |
| 1900 | Word₃ | $P_3$ | $P_8$ | $P_9$ | $P_4$ | |
| | ⋮ | ⋮ | | | | |
| 1900 | Word_m | $P_2$ | $P_x$ | | | |

| 1905 | $P_1$ | Model Parameters₁ₐ | Model Parameters₁ᵦ | Model Parameters₁c |
|---|---|---|---|---|
| | ⋮ | ⋮ | ⋮ | ⋮ |
| 1905 | $P_x$ | Model Parameters_XA | Model Parameters_XB | Model Parameters_XC |
| | | 1910 | 1910 | 1910 |

FIG. 19

SEQUENTIAL, NONPARAMETRIC SPEECH RECOGNITION AND SPEAKER IDENTIFICATION

CROSS REFERENCE TO RELATED APPLICATIONS

The application is a continuation-in-part of U.S. application Ser. No. 08/804,061, filed Feb. 21, 1997 and entitled "SPEAKER IDENTIFICATION USING UNSUPERVISED SPEECH MODELS"; U.S. application Ser. No. 08/807,430, filed Feb. 28, 1997 and entitled "SPEECH RECOGNITION USING NONPARAMETRIC SPEECH MODELS"; and U.S. Provisional Application No. 60/075,997, filed Feb. 26, 1998 and entitled "SPEAKER IDENTIFICATION USING NONPARAMETRIC SEQUENTIAL MODEL", all of which are incorporated by reference.

STATEMENT AS TO FEDERALLY SPONSORED RESEARCH

The government may have certain rights in this invention.

TECHNICAL FIELD

The invention relates to speech recognition.

BACKGROUND

Speaker identification systems identify a person by analyzing the person's speech. In general, there are three kinds of speaker identification: speaker verification, closed set identification, and open set identification.

A speaker verification system compares a sample of speech from a person who professes to be a particular known speaker to previous samples or models of speech of that known speaker. The speaker verification system verifies the identity of the speaker by determining whether the sample matches the previous samples or models.

A closed set identification system analyzes a sample of speech in relation to the speech of each of a set of known speakers. The system then determines that the speech was produced by the known speaker whose speech most closely matches the sample of speech. Thus, a closed set identification system identifies the single known speaker who is most likely to have produced the sample of speech.

An open set identification system analyzes a sample of speech in relation to the speech of each of a set of known speakers. The system determines for each known speaker whether the sample of speech was likely to have come from that speaker. The system may determine that the sample of speech was likely to have come from multiple speakers or none at all.

In one approach to speaker identification, referred to as a large vocabulary continuous speech recognition (LVCSR) approach, speech recognition is used to identify the words spoken by the person as the first step in the identification process. A speech recognition system analyzes a person's speech to determine what the person said. In a typical frame-based speech recognition system, a processor divides a signal derived from the speech into a series of digital frames, each of which corresponds to a small time increment of the speech. The processor then compares the digital frames to a set of speech models. The speech models may be speaker-independent models that represent how words are spoken by a variety of speakers. Speech models also may represent phonemes that correspond to portions of words. Phonemes may be subdivided further within the speech model into phoneme nodes, where a phoneme may be represented by, for example, three phoneme nodes. Collectively, the constituent phonemes for a word represent the phonetic spelling of the word. The processor determines what the person said by finding the speech models that correspond best to the digital frames that represent the person's speech.

After using speech recognition to determine the content of the speech, the speaker identification system determines the source of the speech by comparing the recognized speech to speech models for different known speakers. The likelihood that a particular known speaker is the source of the speech is estimated based on the degree to which the recognized speech corresponds to the speech model for the known speaker.

The speech model for a known speaker may be produced, for example, by having the known speaker read from a list of words, or by having the known speaker respond to prompts that ask the speaker to recite certain words. As the known speaker reads from the list of words or responds to the prompts, the known speaker's speech is sampled and the samples are stored along with the identity of the known speaker. Typically, the samples are stored as speaker-adapted models. Though the speaker-independent model used in speech recognition is typically a triphone model that considers the context in which phonemes are spoken, the scoring models used in speaker identification typically are monophone models that do not consider the context. This permits the scoring models to adapt efficiently from a small amount of data.

In another approach to speaker identification, referred to as a Gaussian mixture model (GMM) approach, each digital frame is compared to a single, speaker-independent mixture model representing all speech and to speaker-adapted mixture models for each of the known speakers. The speaker-independent mixture model is a mixture of approximately 2000 Gaussians and represents all speech without reference to particular phonemes or phoneme nodes. The likelihood that a particular known speaker is the source of the speech is estimated based on the degree to which the digital frames resemble the speaker-adapted models more closely than they resemble the speaker-independent model.

SUMMARY

In one general aspect, the invention features evaluating a speech sample using a computer. Training data that include samples of speech are received and stored along with identification of speech elements to which portions of the training data are related. When a speech sample is received, speech recognition is performed on the speech sample to produce recognition results, and the recognition results are evaluated in view of the training data and the identification of the speech elements to which the portions of the training data are related. The comparison of speech elements in the speech sample and the training data, referred to as sequential nonparametric analysis, may be used, for example, in speech recognition, speaker identification, and language identification.

Embodiments may include one or more of the following features. The training data may be analyzed to designate different portions of the training data as being related to different speech elements. This analysis may include performing large vocabulary continuous speech recognition on the training data to produce training data recognition results and a training data time alignment. The training data recognition results include a sequence of speech elements. The training data time alignment identifies portions of the training data to which each speech element corresponds.

Performing speech recognition on the speech sample may include identifying portions of the speech sample to which different speech elements correspond, in which case evaluating the recognition results may include comparing a portion of the speech sample identified as corresponding to a particular speech element to one or more portions of the training data identified as corresponding to the particular speech element. The evaluation may include a frame-by-frame comparison of the portions. Performing speech recognition on the speech sample may include performing large vocabulary continuous speech recognition to produce speech sample recognition results and a speech sample time alignment. The speech sample recognition results include a sequence of speech elements and the speech sample time alignment identifies portions of the speech sample to which each speech element corresponds.

When the techniques are used in speech recognition, evaluating the recognition results may include evaluating accuracy of the recognition results. For example, when the recognition results include an ordered list of hypotheses about contents of the speech sample, evaluating the recognition results may include reordering the list as a result of the evaluated accuracy of each hypothesis.

When the techniques are used in speaker identification, the training data may be associated with a known speaker and evaluating the recognition results may include determining a likelihood that the known speaker produced the speech sample. When the training data are associated with different known speakers, evaluating the recognition results may include determining which of the known speakers is more likely to have produced the speech sample.

When the techniques are used in language identification, the training data may be associated with a known language and evaluating the recognition results may include determining a likelihood that the speech sample was spoken in the known language.

The recognition results may identify speech elements to which different portions of the speech sample correspond. Evaluating the recognition results may include comparing a portion of the speech sample identified as corresponding to a particular speech element to one or more portions of the training data identified as corresponding to the particular speech element. For example, evaluating the recognition results may include selecting a speech element from the recognition results, comparing a portion of the speech sample corresponding to the selected speech element to a portion of the training data identified as corresponding to the selected speech element, generating a speech element score as a result of the comparison, repeating the selecting, comparing and generating steps for each speech element in the recognition results, and producing an evaluation score for the recognition results based on the speech element scores for the speech elements in the recognition results.

The compared portions of the speech sample and the training data may each be represented by frames of data. Comparing the portions may include aligning the frames of the portions using a dynamic programming technique that seeks to minimize an average distance between aligned frames. Generating the speech element score may include generating the score based on distances between aligned frames.

Producing the evaluation score for the recognition results may include producing the evaluation score based on a subset, such as a best-scoring subset, of the speech element scores. The evaluation score may be normalized. Normalization may include, for example, receiving cohort data that includes samples of speech for a cohort of speakers, storing the cohort data along with identification of speech elements to which portions of the cohort data are related, evaluating the recognition results in view of the cohort data and the identification of the speech elements to which the portions of the cohort data are related to produce a cohort score, and modifying the evaluation score based on the cohort score.

As summarized above, sequential nonparametric techniques may be employed in speech recognition, speaker identification, and language identification. These techniques exploit information that is unavailable when using model-based approaches. Speech signals are inherently nonstationary. Much of the information that they contain lies in their sequential patterns. Thus, to model a speech signal accurately, one should ascertain, at least approximately, the sequence of sounds that the speaker is actually producing. For some purposes, it may be sufficient to recognize the sequence of phonemes in the speech (i.e., the actual semantic content of the utterance may be irrelevant). However, even in those cases, the phoneme sequence may be determined more accurately by using higher level knowledge about the language (e.g., the identity of common words and how they are pronounced, or the identity of common word sequences). For example, some estimates indicate that phoneme-level recognition has an error rate about 15% higher than the error rate of a phoneme transcription inferred from word recognition. Sequential nonparametric techniques also may be applied to other information extraction tasks, such as language identification. For this reason, performing LVCSR on any speech from which information is to be extracted should be productive.

Many current speaker identification systems do not use sequential information, and instead rely on one frame of acoustic data at a time. The argument in favor of using LVCSR for speaker identification depends on the notion that stratifying the evidence in favor of a given speaker over the different speech sounds must be a more powerful way of detecting the presence of the speaker than lumping all speech sounds together. In essence, looking at a particular speaker's way of saying a certain vowel should be more rewarding than simply looking at whether the frames in question resemble any of the individual frames in the stored data for that speaker.

Current model-based approaches rely on Gaussian mixture models to represent where data characteristic of particular speech events are likely to be found in acoustic space. Typically, these mixture models are trained using data derived from many different speakers.

Sequential nonparametric techniques avoid at least two problems associated with model-based approaches. First, the actual structure of the probability distribution of speech frames in high-dimensional space (e.g., 24-dimensional space) may be highly complex. Thus, to approximate the empirical distribution by a linear combination of a small number (e.g., 16) of Gaussians ignores considerable information content of the data. Second, model-based approaches tend to disregard sequential information and treat each frame of data as an independent observation. Nonparametric approaches that compare frames of test data to frames of training data address the first problem of model-based approaches, but fail to address the second.

Instead of comparing individual frames, the sequential nonparametric techniques regard whole speech segments (e.g., sequences of frames) as the units of analysis. Thus, one or more examples of a phoneme (or of a phoneme in a particular context) found in the training data may be stored as elements referred to as training tokens. Thereafter, a likelihood measure indicative of whether a speech segment is an example of a phoneme, or an example of the phoneme produced by a particular speaker, is generated by computing the distance between the segment and each relevant training token.

The distance between a speech segment and a training token may be determined by finding the optimal time alignment of the two using dynamic programming techniques. Then, given the optimal alignment, the squared Euclidean distances between aligned frames may be summed to obtain an overall distance between the speech segment and the training token. Penalties may be added to the raw distances to account for differing numbers of frames in the speech segment and the training token. A score then is generated based on the distances between the speech segment and the training tokens. The score is a measure of the match between the speech segment and the training data represented by the training tokens, and may be determined as a function of the distance of the speech segment from the k nearest training tokens, where k may equal one.

Sequential nonparametric techniques promise to improve both speaker identification systems and speech recognition systems. In an implementation of the techniques for speaker identification, a speaker-independent recognizer is used to generate a phoneme-level transcription of a speech sample from an unidentified source. The recognizer also generates a time alignment of the digital frames of the speech sample with the phonemes identified in the transcription.

Assuming that a certain amount of recorded speech for each known speaker is available, and has been recognized (i.e., errorfully transcribed), particular sequences of recognized phonemes in the unidentified speech that also occur in the recorded speech of the known speaker may be analyzed using the sequential nonparametric techniques. In preparation for this analysis, the recorded speech for the known speaker is recognized using LVCSR and a time alignment is obtained. Thereafter, an inventory of training tokens is constructed for each observed phoneme.

Digital frames from training tokens that represent a phoneme identified in the transcription (referred to as training frames) are time aligned with corresponding frames from the speech used to produce the transcription (referred to as test frames), and the distance between the training frames and the test frames is computed to find the closest training token and to generate a corresponding score. This process is repeated for each phoneme in the transcription. The scores for the phonemes (or perhaps the best 50% or 75% of length normalized versions of the scores) are summed and divided by the number of frames in the corresponding segments to obtain a score per frame. When the test speaker (i.e., the speaker who produced the unidentified speech) is the same as the known speaker, there should be a strong resemblance between the test frames and training frames.

The sequential nonparametric analysis also may be expressed as a three-step process. First, an approximation of the sequence of phonemes said by the test speaker is determined. Next, a best guess about what the known speaker's speech frames would look like if the known speaker said what the test speaker said is determined. Finally, dynamic programming is used to compare the hypothetical target frames (i.e., the training frames) to the observed test frames.

One way to apply sequential nonparametric techniques to speech recognition is to compile a list of the "N" best transcriptions of a given utterance (referred to as a N-best list). For each choice on the list, the speech is time aligned with the pronunciation of the given transcription (i.e., a determination is made as to where each phoneme begins and ends). A nonparametric matching step then is performed. For each phoneme in the given transcription, the closest training token in the training data is found and the distance between the phoneme and the training token is determined. These distances then are summed over the set of test tokens in the utterance. The resulting score may be normalized and interpolated with a more traditional acoustic score and any other scores that are available (e.g., language model score, duration score, confidence score). In some instances, such as, for example, when no training data is available for a particular phoneme, the acoustic score is used instead of the nonparametric score.

Many aspects of the sequential nonparametric analysis, including penalties used for skipping and doubling during sequence matching, the criterion used to determine which tokens to retain in the comparison of utterances (currently the best 75%), the technique used to combine scores, and the unit of comparison (e.g., phoneme, triphone, word) may be adjusted to optimize performance.

Normalization is another issue associated with the application of sequential nonparametric techniques. For speaker identification, scores for different known speakers, or for different utterances by the same known speaker, may need to be compared. Due to the nonparametric nature of the sequential nonparametric analysis, there is no speaker-independent background model on which to base normalization. One way to address this is to use a collection of cohort speakers to produce normalizing information.

Weighted combinations of the different speaker identification approaches (e.g., GMM, LVCSR, and sequential nonparametric) may employ simple averaging. Alternatively, weighted combinations of the different approaches may be tailored to their relative value under various conditions. Information from the sequential nonparametric analysis is complementary to the other analyses, since GMM completely ignores sequential information, and LVCSR does not rely on sequential information to as great a degree as does the sequential nonparametric analysis.

The techniques may be implemented in computer hardware or software, or a combination of the two. However, the techniques are not limited to any particular hardware or software configuration; they may find applicability in any computing or processing environment that may be used for speech recognition or speaker identification. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to the one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings and the claims.

DESCRIPTION OF DRAWINGS

FIGS. 3, 5, 7 and 10 are flow charts of procedures performed by the speech recognition system of FIG. 1.

FIG. 6 illustrates time alignments produced by the system of FIG. 1.

FIGS. 12–14 and 16 are flow charts of procedures performed by the speaker identification system of FIG. 11.

FIGS. 15 and 17–20 are block diagrams of data structures of the speaker identification system of FIG. 11.

DETAILED DESCRIPTION

Sequential nonparametric analysis may be employed to improve the performance of speech recognition and speaker identification systems. Incorporation of sequential nonparametric analysis into a speech recognition system is discussed first. This discussion is followed by a description of the use of sequential nonparametric analysis in speaker identification.

Figure 1:
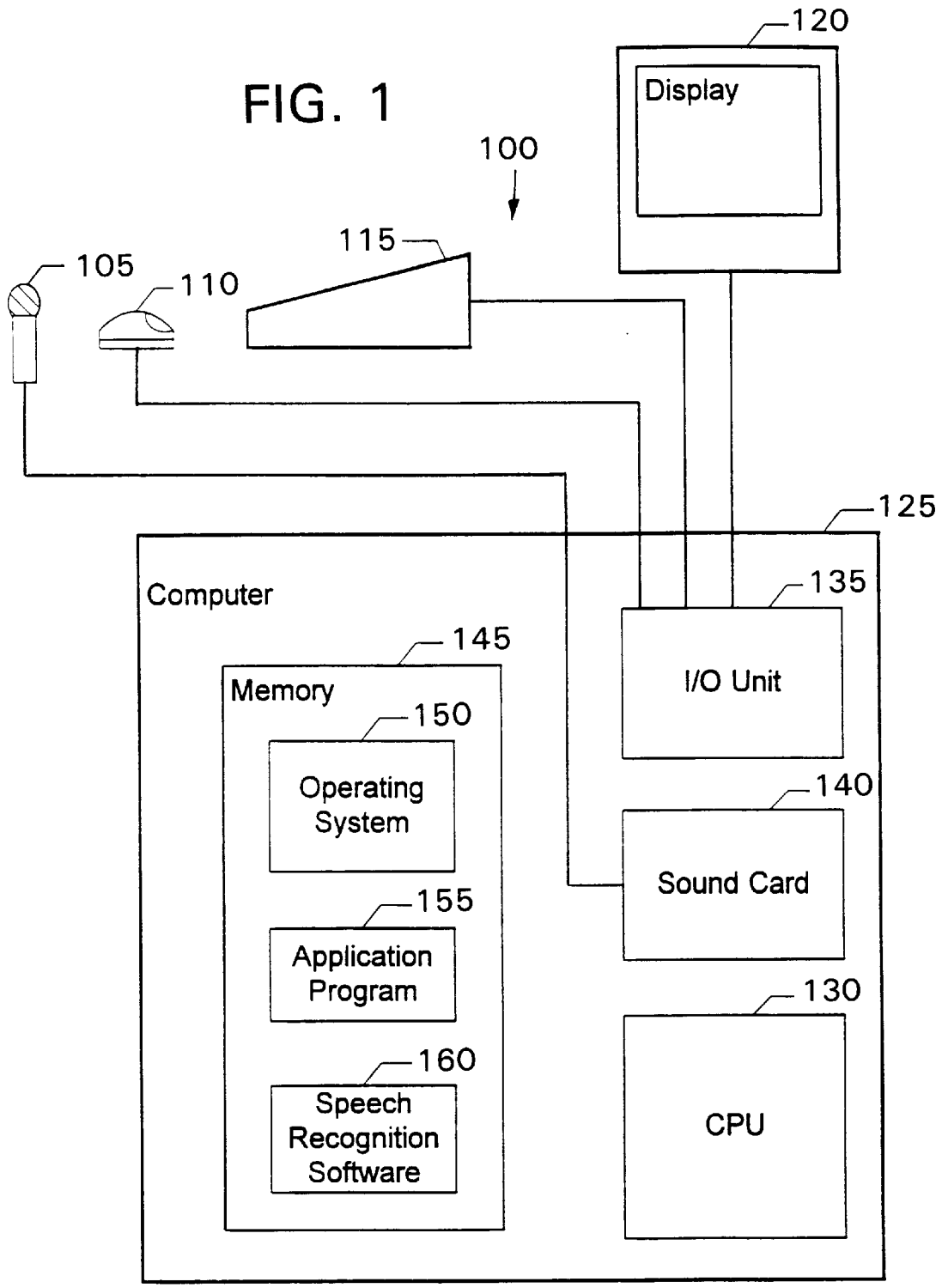
FIG. 1 is a block diagram of a speech recognition system.

Referring to FIG. 1, a speech recognition system 100 includes input/output (I/O) devices (e.g., microphone 105, mouse 110, keyboard 115, and display 120) and a general purpose computer 125 having a processor 130, an I/O unit 135 and a sound card 140. A memory 145 stores data and software such as an operating system 150, application software 155 (e.g., a word processing program), and speech recognition software 160.

Figure 2:
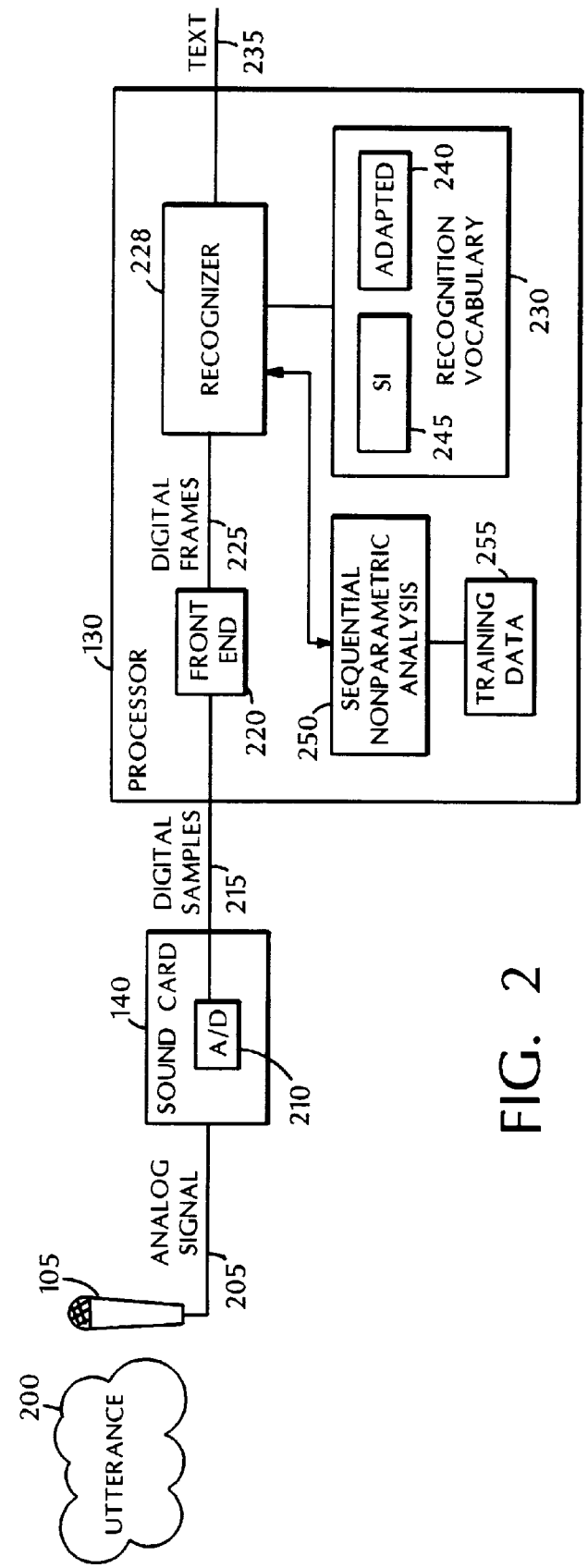
FIG. 2 is a flow diagram of data flow through the speech recognition system of FIG. 1.

Referring also to FIG. 2, the microphone 105 receives an utterance 200 from a speaker and conveys the utterance, in the form of an analog signal 205, to the sound card 140, which in turn passes the signal through an analog-to-digital (A/D) converter 210 to transform the analog signal 205 into a set of digital samples 215. The processor 130 analyzes the digital samples 215 using front end processing software 220 to produce a sequence of frames 225 which represent the frequency content of the utterance. Each frame includes several (e.g., 24) parameters and represents a short portion (e.g., 10 milliseconds) of the utterance.

Figure 3:
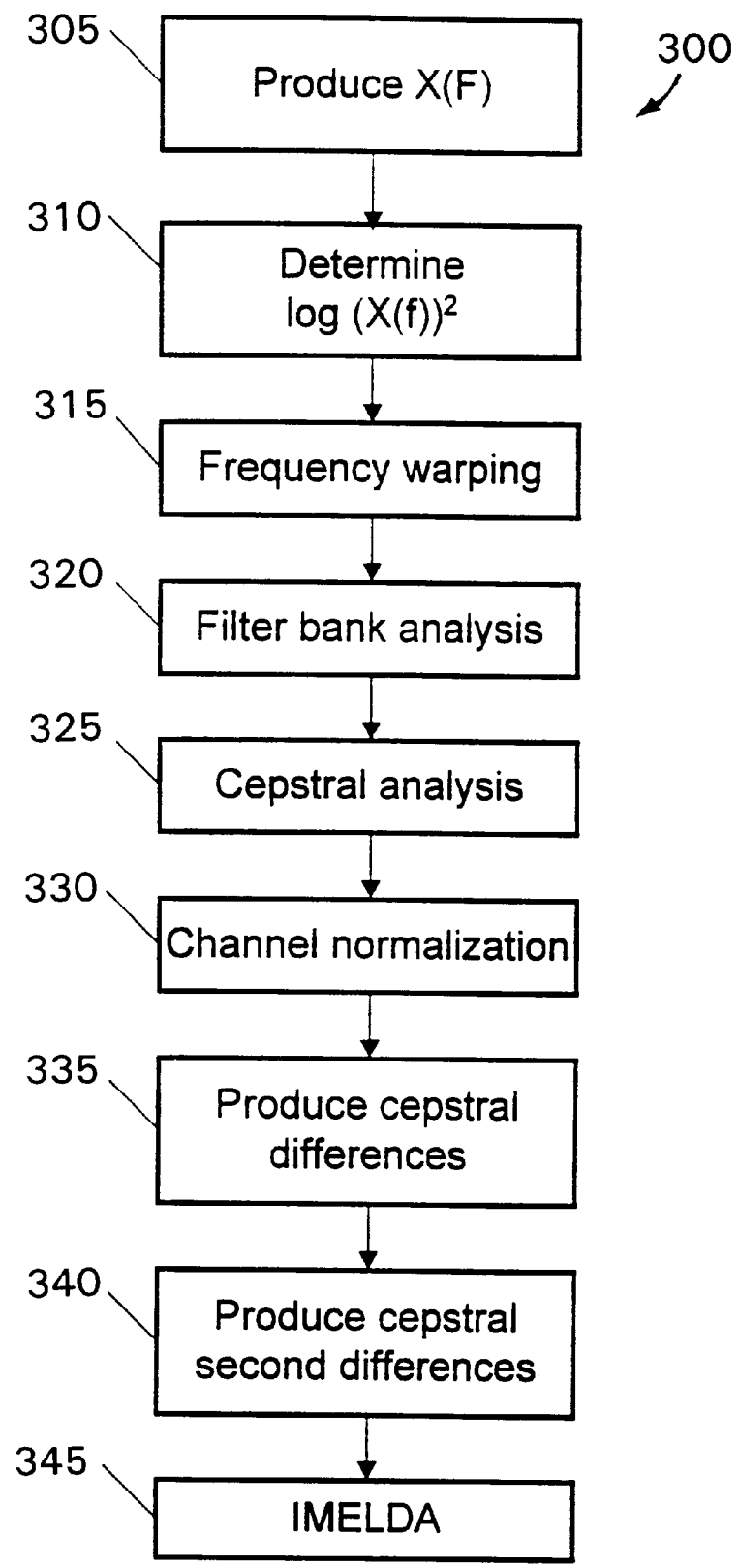

In one implementation, as shown in FIG. 3, the front end processing software 220 causes the processor 130 to operate according to a procedure 300 to produce a frame from digital samples 215 corresponding to a portion of an utterance to be represented by the frame. First, the processor produces a frequency domain representation $X(f)$ of the portion of the utterance by performing a Fast Fourier Transform (FFT) on the digital samples 215 (step 305). Next, the processor determines $\log(X(f))^2$ (step 310). The processor then performs frequency warping (step 315) and a filter bank analysis (step 320) to achieve speaker normalization. From the normalized results, the processor performs cepstral analysis (step 325) to produce twelve cepstral parameters. The processor generates the cepstral parameters by performing an inverse cosine transformation on the logarithms of the frequency parameters. Cepstral parameters and cepstral differences have been found to emphasize information important to speech recognition more effectively than do the frequency parameters. Next, the processor performs channel normalization of the cepstral parameters (step 330). The processor then produces twelve cepstral differences (i.e., the differences between cepstral parameters in successive frames) (step 335) and twelve cepstral second differences (i.e., the differences between cepstral differences in successive frames) (step 340). Finally, the processor performs an IMELDA linear combination transformation (step 345) to select the twenty four most useful parameters from the twelve cepstral parameters, the twelve cepstral differences, and the twelve cepstral second differences.

Figure 4:
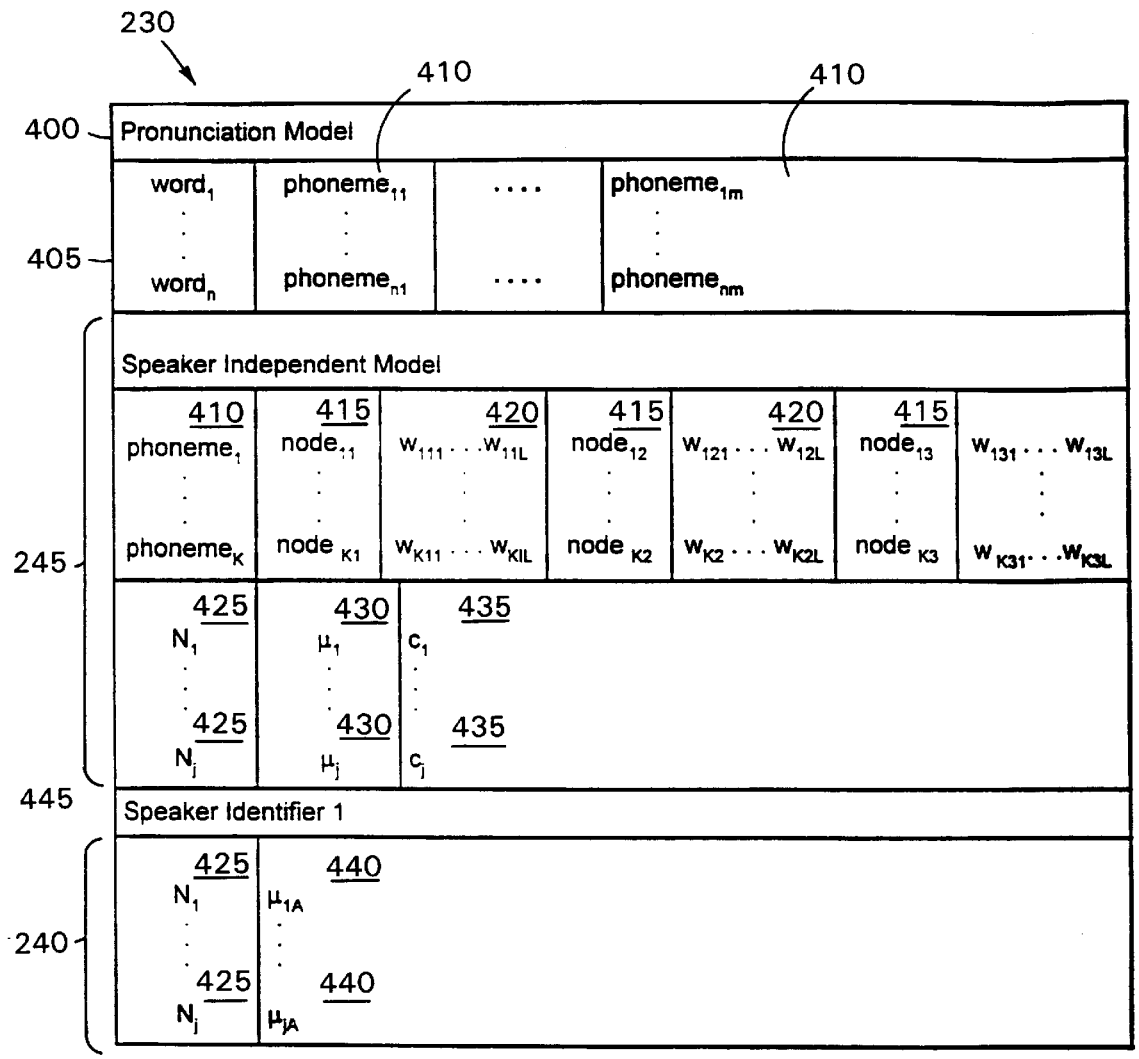
FIG. 4 is a block diagram of a data structure of the speech recognition system of FIG. 1.

Referring again to FIG. 2, the processor 130, under control of recognizor software 228, compares the sequence of frames 225 to acoustic models from a recognition vocabulary 230 to identify the text 235 that corresponds to the sample. As shown in FIG. 4, the recognition vocabulary 230 uses a pronunciation model 400 in which each word 405 is represented by a series of phonemes 410 (e.g., /ah/, /r/, /d/) that comprise the phonetic spelling of the word. The processor 130 compares the sequence of frames 225 to acoustic models for the phonemes using a dynamic programming technique to identify the series of phonemes, and the corresponding series of words, that best correspond to the sequence of frames. An example of a dynamic programming technique used in connection with speech recognition is disclosed in U.S. Pat. No. 4,783,803, which is incorporated by reference. In making the comparison, the processor produces a time alignment that relates each frame of the sequence to a particular phoneme.

The processor 130 compares the sequence of frames 225 to adapted acoustic models from a speaker-adapted model 240 in the recognition vocabulary 230, if such a model is available. Otherwise, the processor compares the sequence of frames 225 to acoustic models from a speaker-independent model 245 in the recognition vocabulary 230.

As noted above, and as shown in FIG. 4, the recognition vocabulary represents each word 405 using a series of phonemes 410. In one implementation, the speaker-independent model 245 represents each phoneme as a triphone 410 that includes three nodes 415. A triphone is a context-dependent phoneme. For example, the triphone "abc" represents the phoneme "b" in the context of the phonemes "a" and "c", with the phoneme "b" being preceded by the phoneme "a" and followed by the phoneme "c".

The speaker-independent model 245 represents each triphone node 415 as a mixture of Gaussian probability density functions (PDFs). For example, the speaker-independent model 245 may represent node "i" of a triphone "abc" as $ab^ic$:

$$ab^jc = \sum_k w_k N(\mu_k, c_k),$$

where each $w_k$ is a mixture weight, $$\sum_k w_k = 1,$$

$\mu_k$ is a mean vector for the probability density function (PDF) $N_k$, and $c_k$ is the covariance matrix for the PDF $N_k$. Like the frames in the sequence of frames 225, the vectors $\mu_k$ each include 24 parameters and the matrices $c_k$ are twenty four by twenty four matrices. Each triphone node may be represented as a mixture of up to, for example, sixteen different PDFs.

A particular PDF may be used in the representation of multiple triphone nodes. Accordingly, the speaker-independent model 245 represents each triphone node 415 as a collection of mixture weights $w_k$ 420 associated with up to sixteen different PDFs $N_k$ and separately represents each PDF $N_k$ 425 using a mean vector $\mu_k$ 430 and a covariance matrix $c_k$ 435. Use of a particular PDF to represent multiple triphone nodes permits the model 245 to include a smaller number of PDFs than would be required if each triphone node included entirely separate PDFs. Since the English language may be roughly represented using 43 different phonemes, there may be up to 79,507 ($43^3$) different triphones, which would result in a huge number of PDFs if each triphone node were represented by a separate set of PDFs. Representing multiple nodes with common PDFs also may remedy or reduce a data sparsity problem that results because some triphones (e.g., "tzp" in the English language) rarely occur. These rare triphones may be represented by having closely-related triphones share the same set of PDFs.

The speaker-adapted model 240 uses the mixture weights $w_k$ 420 and the covariance matrices $c_k$ 435 of the speaker-independent model 245. However, unlike the speaker-independent model 245, the speaker-adapted model 240 uses adapted mean vectors $\mu_{kA}$ 440 that have been adapted for a particular speaker. In other implementations, the speaker-adapted model may use adapted mixture weights and covariance matrices.

Referring again to FIG. 2, the processor 130 employs sequential nonparametric analysis 250 to improve the performance of the recognizor 228. The sequential nonparametric analysis is based on a comparison of the digital frames 225 to training data 255. The training data 255, which may correspond to speech of the speaker who produced the utterance 200, may be the data used to produce the adapted model 240.

Figure 5:
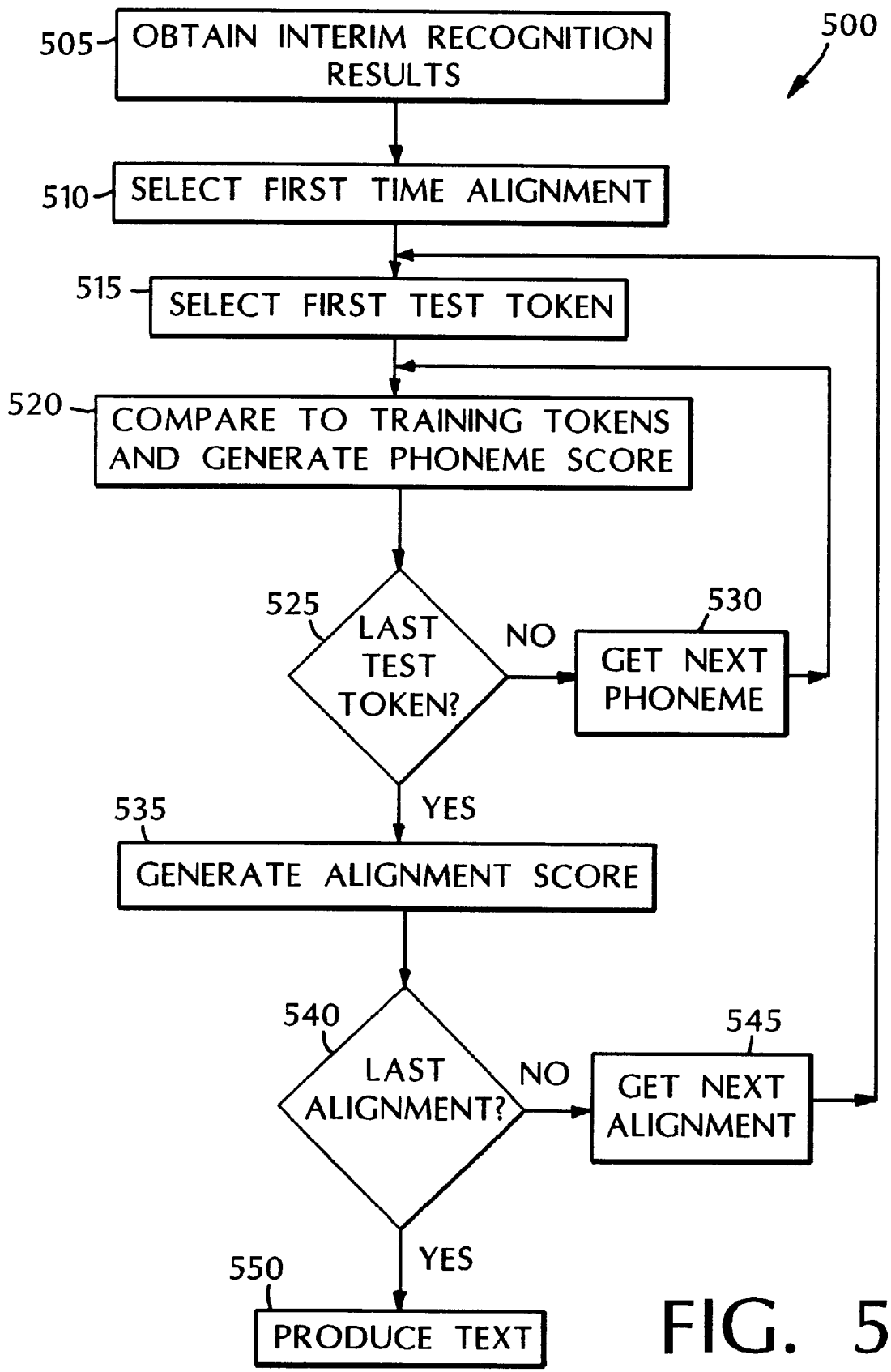

Referring to FIG. 5, the sequential nonparametric analysis proceeds according to a procedure 500. The analysis begins with interim results from the recognizor 228 (step 505). These results include a set of potential time alignments of the digital frames 225 with modelling units from the recognition vocabulary, and also may include a score associated with each time alignment. The following discussion assumes that the modelling units are monophone phonemes.

The modelling units could take other forms, such as, for example, phrases, words, triphone phonemes, or phoneme nodes, where phrases, words, and triphone phonemes are more specific than monophone phonemes. As the modelling units become more specific, the amount of data to be considered with respect to a particular utterance decreases, which means that the complexity of the analysis decreases.

However, the likelihood that the training data 255 will include no examples of a particular modelling unit, referred to as the data sparsity problem, increases with increasing specificity. Accordingly, the type of modelling unit to be employed is selected by balancing the desired analytical complexity against the amount of training data available.

FIG. 6 illustrates different time alignments for digital frames 225A corresponding to the utterance "let's recognize speech" 200A. A first alignment 600A corresponds to the text "let's recognize speech" 235A. A second alignment 600B corresponds to the text "let's wreck a nice beach" 235B. In each alignment, sequences of frames are said to correspond to different phonemes. The two alignments may include different numbers of phonemes, and the number of frames aligned with a particular phoneme may differ between alignments.

A time alignment provides a specification of which sequences of frames correspond to which phonemes, where a sequence of frames is referred to as a test token. Each test token is scored against all frame sequences in the training data 255 that correspond to the same phoneme. These frames sequences from the training data are referred to as training tokens. For each training token, the best alignment of the test token with the training token is determined using a standard dynamic programming algorithm, using the Gaussian distance between two frames as a metric, and a score for the test token/training token pair is generated. The best score over all training tokens for the test token then is selected. Because some test tokens in the test data can lack any reasonable match in the training data (e.g., due to rare phonemes or other data sparsity problems), and for general robustness (e.g., against noise) considerations, only a subset (e.g., the best-scoring 75%) of the test tokens are considered. The score for the time alignment then corresponds to the sum of the scores for the selected subset of test tokens divided by the number of digital frames represented by the selected subset.

Referring again to FIG. 5, the first time alignment (step 510) and the first test token of that time alignment (step 515) are selected. The selected phoneme is compared to training tokens from the training data 255 for the selected phonemes to generate a score for the phoneme (step 520). If the selected test token is not the last test token in the time alignment (step 525), the next test token is selected (step 530) and scored (step 520). This is repeated until the last phoneme is scored, at which point a score for the time alignment is generated (step 535). If the selected time alignment is not the last time alignment (step 540), the next time alignment then is selected (step 545) and the scoring procedure (steps 515–535) is repeated until the last time alignment is scored.

After scoring is complete, the best-scoring time alignment is selected to produce the text 225 (step 550). The score for a time alignment may be the score produced by the sequential nonparametric analysis described above. Alternatively, the score for a time alignment may be produced by combining the score from the sequential nonparametric analysis with a score generated by the recognizor 228. The scores may be combined using a weighting factor w to produce a final score:

$$S_{final} = wS_{snp} + (1-w)S_{rec},$$

where $S_{snp}$ is the score produced by the sequential nonparametric analysis and $S_{rec}$ is the score produced by the recognizor. When the text 225 is produced as an n-best list, the sequential nonparametric scores or the combined scores may be used to order the entries in the list.

Referring to FIG. 7, a phoneme score is generated according to a procedure 520. Initially, the first training token is selected (step 700) and a dynamic programming technique is used to align the test token with the training token (step 705). The dynamic programming technique identifies the best-scoring alignment of the test token with the training token. A permissible alignment must satisfy two basic rules. First, each frame of the test token must be related to a corresponding frame of the training token (i.e., the alignment must use all frames of the test token). Second, frames must be aligned in order (i.e., paths drawn between frames of the test token and corresponding frames of the training token may not cross). In addition, since the test token and the training token may be of different lengths, consecutive frames of the test token may correspond to a single frame of the training token (e.g., when the test token includes more frames than the training token), and frames of the training token may be skipped (e.g., when the test token includes less frames than the training token). Skipping penalties may be employed to account for frames of the training token that are skipped, and doubling, tripling, etc. penalties may be employed when an alignment has multiple frames of the test token correspond to a single frame of the training token. In addition, a maximum number of frames that may be skipped or doubled also may be defined.

Figure 8A:
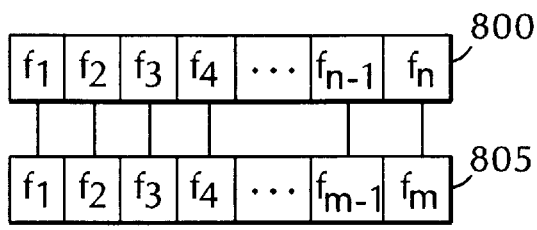
FIGS. 8A–8C and 9A and 9B illustrate, respectively, permissible and impermissible alignments of test tokens and training tokens.
Figure 8B:
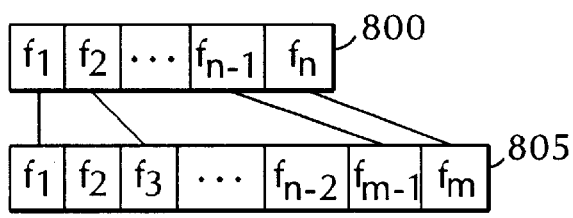
Figure 8C:
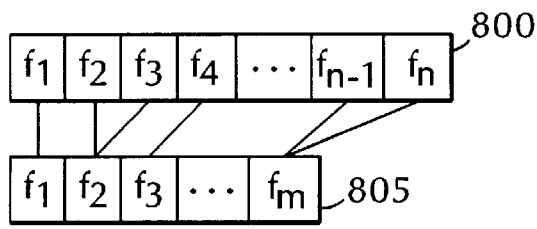

Examples of permissible alignments between test tokens 800 and training tokens 805 are illustrated in FIGS. 8A–8C. The alignment of FIG. 8A would require no penalties. The alignment of FIG. 8B would require skipping penalties because frames $f_2$ and $f_{n-2}$ of the training token are skipped. The alignment of FIG. 8C would require doubling penalties because frames $f_2$ and $f_n$ of the training token each correspond to two frames of the test token.

Figure 9A:
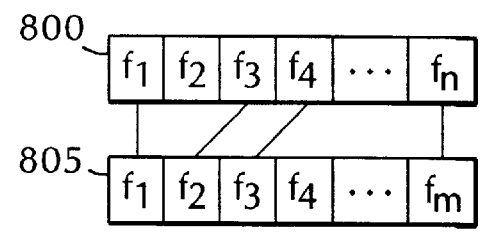
Figure 9B:
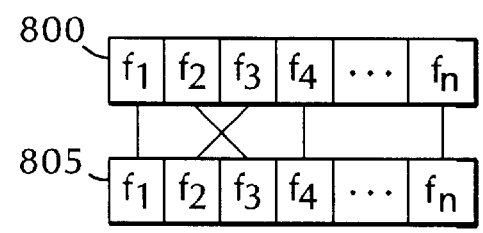

Examples of impermissible alignments are illustrated in FIGS. 9A and 9B. The alignment of FIG. 9A is impermissible because frame $f_2$ of the training token is skipped. The alignment of FIG. 9B is impermissible because the frames are not aligned in order.

The score for an alignment may be determined by summing the squares of the Euclidean distances between aligned frames of the test token and the training token and adding any skipping, doubling or other penalties. When a frame is represented by, for example, 24 components, the Euclidean distance may be determined as the square root of the sum of the squares of the differences between corresponding component values. Alternative scoring techniques may be used. For example, the maximum distance between pairs of elements may be used.

If the selected training token is not the last training token (step 710), the next training token is selected (step 715) and scored (step 705). After the last training token is scored, the score for the best-scoring training token is selected as the phoneme score (step 720).

Referring to FIG. 10, the alignment score for a time alignment is generated according to a procedure 535. Initially, because some test tokens in the utterance 200 can lack any reasonable match in the training data 250 (e.g., due to rare phonemes or other data sparsity problems), and for general robustness considerations, a subset of the test tokens are selected (step 1000). For example, the best scoring 75% of the test tokens may be selected. The selection may proceed, for example, by dividing the score for each sequence by the number of frames in the sequence and ranking the results. The alignment score then is generated by summing the scores for sequences in the selected subset (step 1005) and dividing the result by the sum of the number of frames in all of the selected sequences (step 1010).

Referring again to FIG. 2, sequential nonparametric analysis may be used in conjunction with a speaker-independent model 245 or a speaker-adapted model 240. Sequential nonparametric analysis need not be employed for each utterance. For example, the analysis may be used only when the results produced by the recognizor 228 are uncertain (e.g., when the best-scoring time alignment for an utterance is not better than the next-best-scoring time alignment by more than a threshold amount).

The text 235 produced by the processor 130 may be the text corresponding to the best-scoring time alignment. Alternatively, the text 235 may be an ordered N-best list of the text corresponding to the N best-scoring time alignments.

Figure 11:
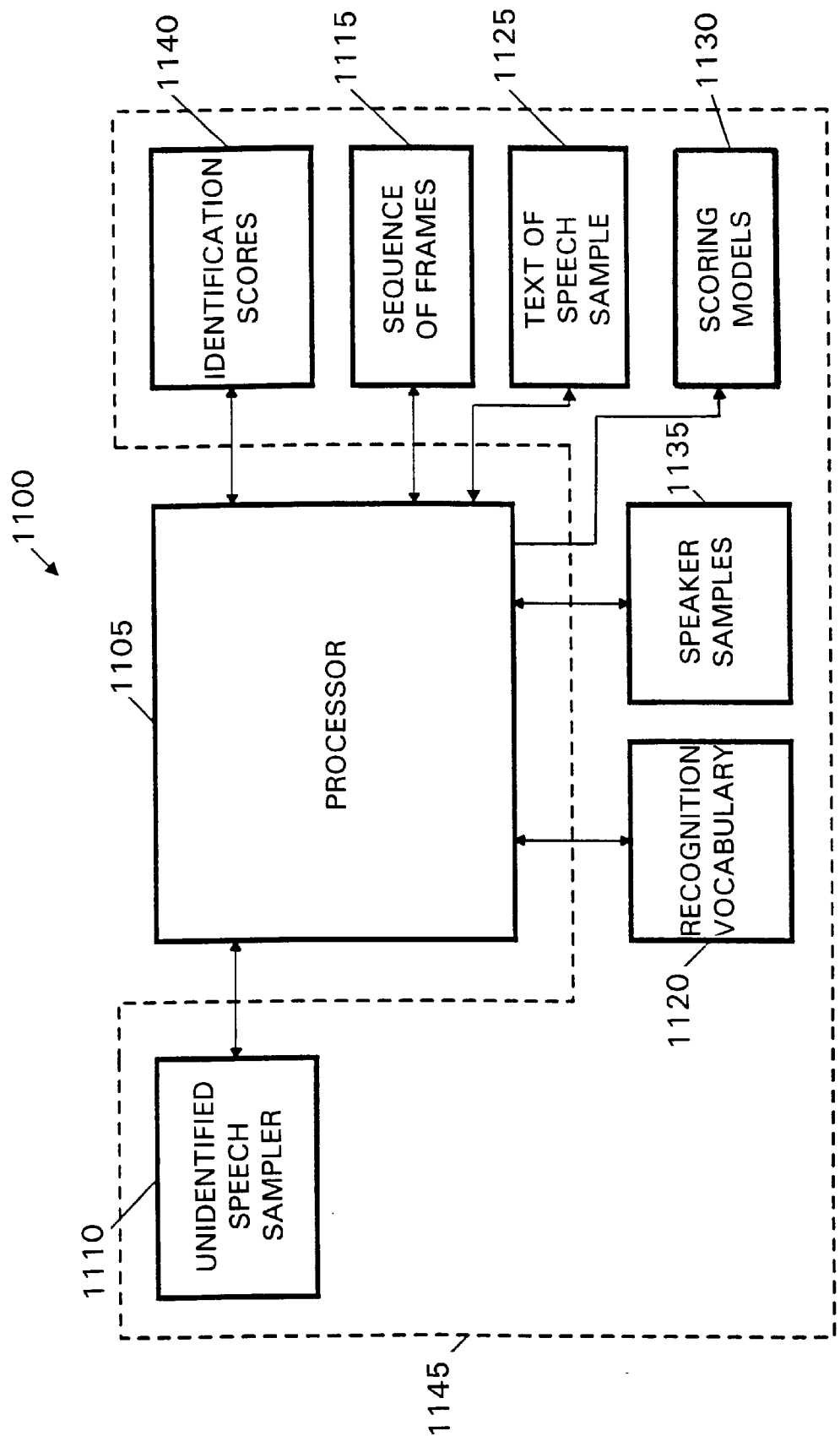
FIG. 11 is a block diagram of a speaker identification system.

Referring to FIG. 11, a speaker identification system 1100 uses sequential nonparametric analysis to capture sequential information lost in systems that rely, for example, solely on single-state mixture models. The system 1100 uses large vocabulary continuous speech recognition (LVCSR) on an unidentified speech sample to produce recognition results and a time alignment of the recognition results with the unidentified speech sample. A scoring stage of the system compares sequences of frames corresponding to phonemes or other modelling units (e.g., test tokens) to corresponding tokens (e.g., training tokens) in training data for different target speakers to produce identification scores for the different target speakers. Since a speaker-independent background model is not available, a cohort method is used for normalization of the scores.

The speaker identification system 1100 includes a processor 1105 that performs speech recognition as a first step in identifying the speaker who produced an unidentified speech sample 1110. The speech sample 1110 is in the form of a set of digital samples similar to the digital samples 215 illustrated in FIG. 2 and discussed above. The digital samples may be produced in the manner discussed above, or may be produced by other means. For example, the digital samples may be generated from a broadcast signal.

Referring also to FIG. 12, the processor 1105 performs speaker identification according to a procedure 1200. Initially, the processor 1105 analyzes the digital samples of the speech sample 1110 to produce a sequence of frames 1115 which represent the frequency content of the sample as it varies with time (step 1205). Each frame represents a short portion (e.g., 10 milliseconds) of the sample 1110. The frames may be produced as discussed above with respect to FIG. 3, or by using similar techniques.

As discussed above, the processor compares the sequence of frames 1115 to acoustic models of phonemes from a recognition vocabulary 1120 to identify text 1125 that corresponds to the sample 1110, and a time alignment of the sample 1110 with the phonemes represented by the text 1125 (step 1210). The recognition vocabulary 1120 represents the phonemes as discussed above with respect to the recognition vocabulary 230. Since the identity of the speaker is not known, the recognition vocabulary employed is in the form of a speaker-independent vocabulary.

The processor uses the time alignment to analyze the frames 1115 with respect to scoring models 1130 for known speakers (step 1215), and to perform a sequential nonparametric analysis of the frames 1115 relative to speech samples 1135 for the known speakers (step 1220). The processor then combines the results of these analyses to produce identification scores 1140 for the different known speakers (step 1225), where an identification score indicates whether the sample 1110 is likely to have been produced by the known speaker who produced the speech corresponding to a particular scoring model and set of speaker samples. In a closed set identification system, the processor designates the known speaker corresponding to the best identification score. In an open set identification system, an identification score provides an estimate of the probability that speech corresponding to a sample 1110 came from the speaker to which the score corresponds.

Since only limited training data for a known speaker typically are available, the scoring models 1130 typically employ small models, such as monophone models. There are two versions of the scoring models: the unadapted form and the adapted form. Each frame of the unidentified speech sample (excluding silence) is scored against the two versions of the appropriate output distribution of the scoring models (based on the time alignment). The difference between these two scores, which are in the form of log probabilities, are averaged over all speech frames, and that average score difference is used in generating the speaker identification score. In brief, this approach generates a likelihood ratio test of the null hypothesis that the unidentified speech was not spoken by the target speaker. The adapted scoring models are obtained by first recognizing the training speech with the speaker independent recognizor, and then performing unsupervised adaptation with Bayesian smoothing.

Figure 13:
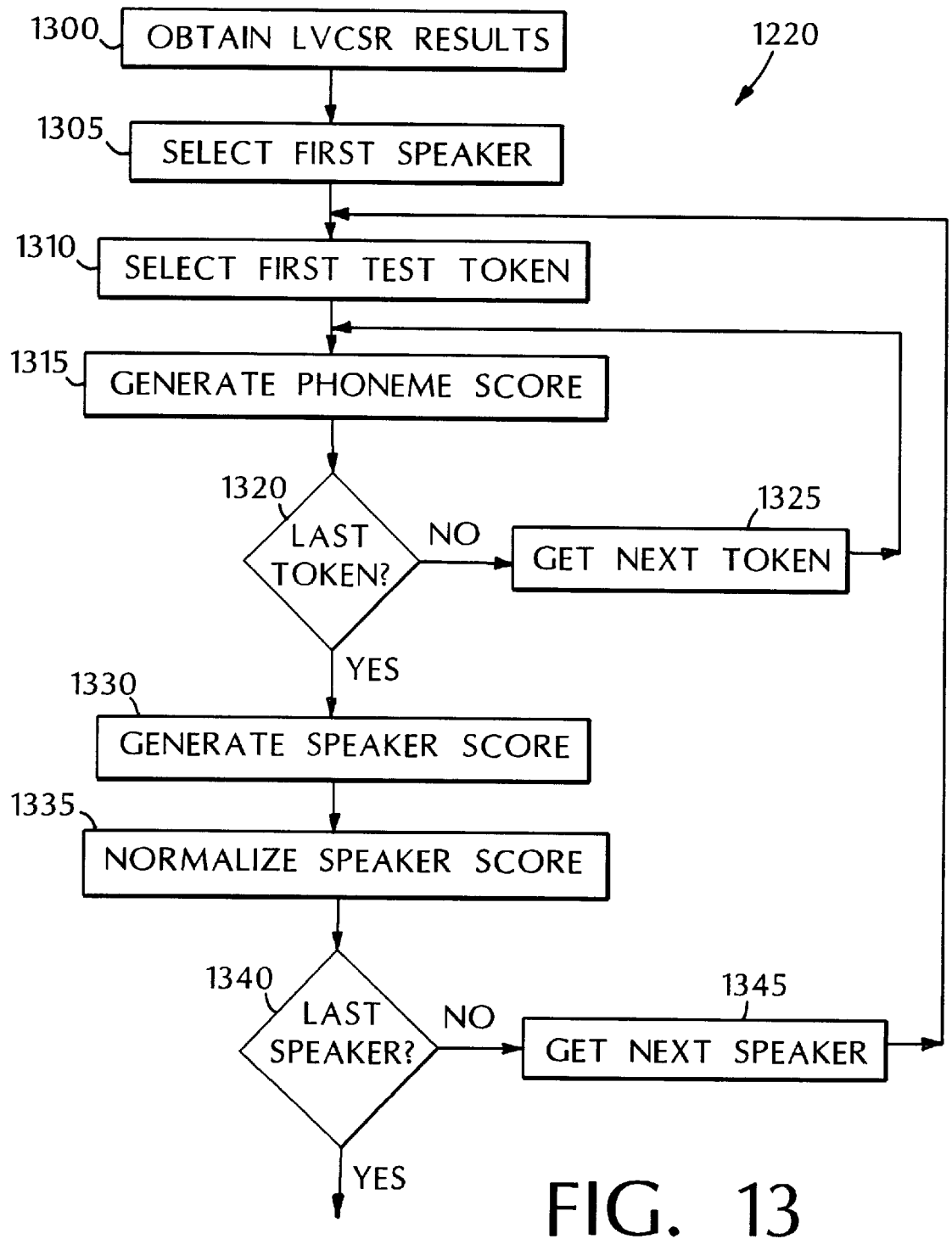

Referring to FIG. 13, the sequential nonparametric analysis proceeds according to a procedure 1220. The analysis begins with results from the LVCSR (step 1300). These results include a time alignment of the digital frames 1115 with monophone phonemes (or other modelling units). Next, the first known speaker (step 1305) and the first test token (step 1310) are selected. The selected test token is compared to training tokens from the speaker samples 1135 for the selected speaker according to the procedure illustrated in FIG. 7 and discussed above to generate a score for the phoneme (step 1315). If the selected test token is not the last test token in the LVCSR results (step 1320), the next test token is selected (step 1325) and scored (step 1315). This is repeated until the last test token is scored, at which point a score for the speaker is generated according to the procedure illustrated in FIG. 10 and discussed above (step 1330).

Next, the speaker score is normalized (step 1335). The scores from the analysis using the scoring models are normalized through use of a speaker-independent scoring model (i.e., the normalized score reflects the difference between the score for the speaker-adapted model and the score for the speaker-independent model). Normalization of the scores from the sequential nonparametric analysis is complicated somewhat by the absence of a speaker-independent background model. Instead of such a model, a cohort method using a cohort including a number (e.g., twenty) of speakers is employed. Speakers in the cohort are selected so that the known speakers are never included in the cohort. A cohort score is generated by scoring each member of the cohort as if the member were a known speaker and then combining the scores for the members of the cohort. Combination techniques include averaging the scores for the entire cohort or for the best-scoring portion (e.g., the best-scoring 75% or 50%) of the cohort. Cohort scores may be reused for different known speakers. When the gender of the speaker for which the score is being normalized is known, a gender-specific cohort may be employed. The cohort score is subtracted from the speaker score to produce a normalized speaker score. The normalized speaker score is further normalized using Z-normalization techniques to align the score with the expected distribution of scores for unknown, non-cohort speakers.

The normalized sequential nonparametric score may be combined with a score from a LVCSR analysis, a score from a GMM analysis, or with scores from both analyses. Since the sequential nonparametric analysis relies on information that is not used by the LVCSR and GMM analyses, but does not employ all of the information used by those analyses, the combined score should be more accurate than each of the individual scores.

Finally, if the selected speaker is not the last speaker (step 1340), the next speaker is selected (step 1345) and the scoring procedure (steps 1310–1335) is repeated until the last speaker is scored.

Referring again to FIG. 11, the unidentified speech sample 1110, the sequence of frames 1115, the recognition vocabulary 1120, the text of the unidentified speech sample 1125, the scoring models 1130, the speaker samples 1135, and the identification scores 1140 may be stored in a storage device 1145, such as a memory or a hard drive, associated with the processor 1105.

Figure 14:
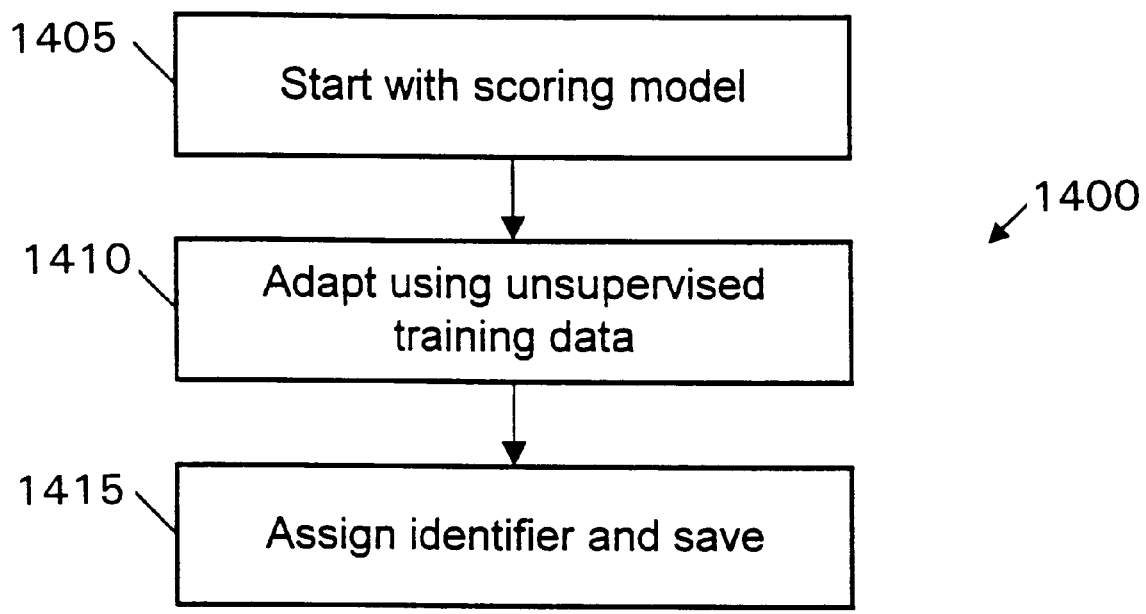
Figure 15:
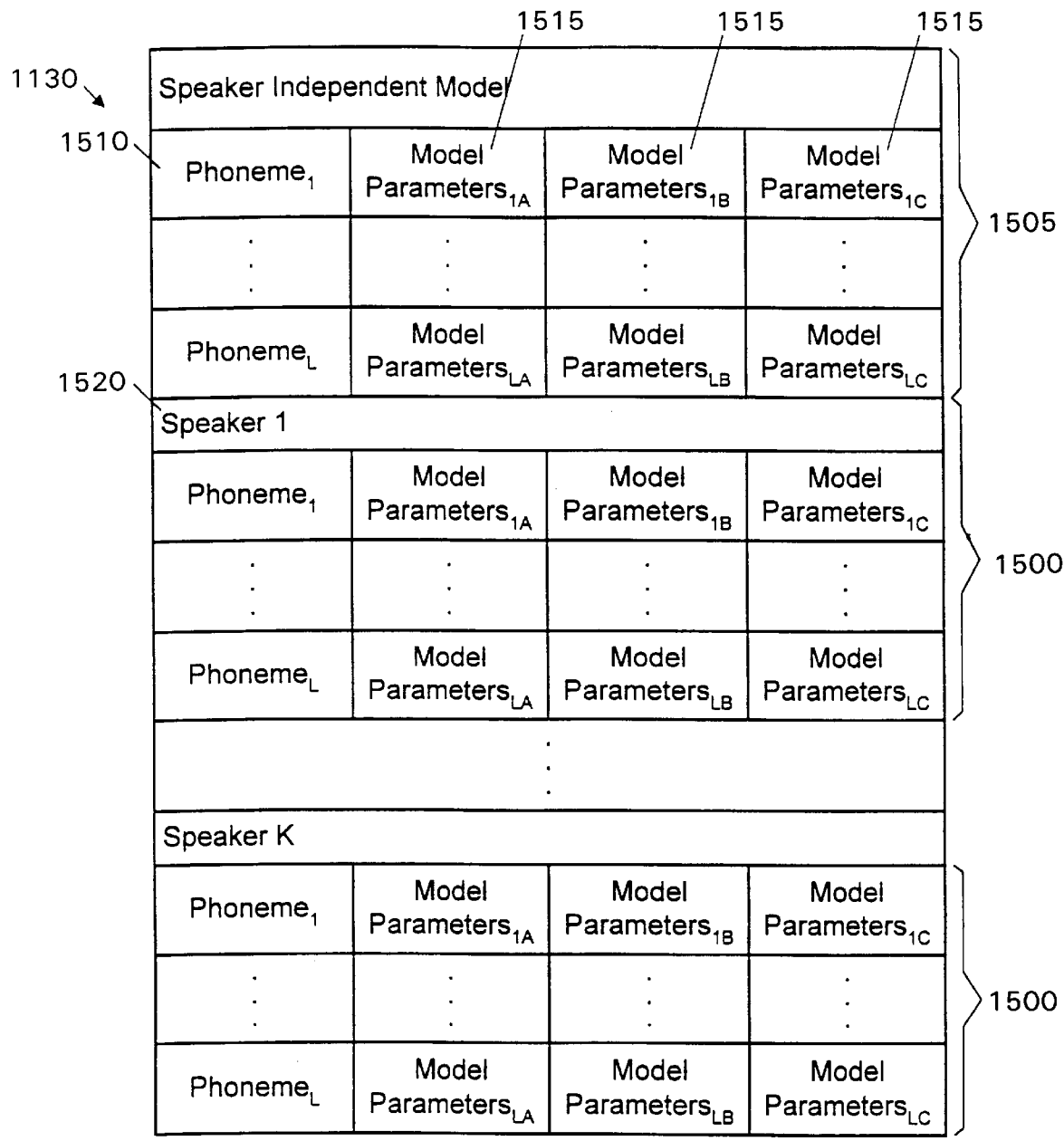

Referring to FIGS. 14 and 15, the processor 1105 produces a scoring model 1500 for a known speaker according to a procedure 1400. The processor starts with a speaker independent model 1505 (step 1405), referred to as a scoring model, that may be adapted to the known speaker. In one implementation, the scoring model 1505 is a monophone model, which means that the model represents each phoneme 1510 independently of the context of other models. The monophone model may represent the English language as having 43 different phonemes. Since the scoring model 305 represents each phoneme 310 using three nodes, the scoring model includes 129 sets of parameters 1515 (43 phonemes×3 sets of parameters per phoneme). By contrast, the recognition vocabulary 1120 uses a triphone model that represents each phoneme in the context of the two adjacent phonemes. Since there are 43 phonemes, there are $43^3$ possible triphones. A clustering technique is used to reduce the number of sets of model parameters employed to a more manageable number on the order of 5–20,000. Thus, a monophone scoring model 1505 will be substantially smaller than the recognition vocabulary 1120. In addition, the scoring model 1505 permits comparison of a phoneme that appears in the model 1115 of the unidentified speech sample 1110 with a phoneme that is included in the scoring model 1505, even when the phonemes appear in two different words in the two models. This permits speech to be analyzed without requiring a word-for-word match between the speech and the training data used to produce the scoring model. For example, the phoneme corresponding to the "u" in the word "but" could be compared to the phoneme corresponding to the "u" in the word "cup". In some embodiments, a context dependent scoring model may be employed.

The scoring model 1505 represents each phoneme node using parameters 1515 that represent the frequency content typically associated with the phoneme node. Parameter types may include frequency parameters, cepstral parameters, and signals derived from the frequency parameters and cepstral parameters. Frequency parameters represent the content of the speech at each of a set of frequency bands and are generated using a fast fourier transform (FFT). Cepstral parameters are generated by performing a cosine transformation on logarithms of the frequency parameters. Cepstral parameters have been found to emphasize information important to speech recognition more effectively than frequency parameters. The processor may combine the cepstral parameters using an IMELDA linear discrimination transformation or similar techniques.

In one implementation, the scoring model 1505 represents each phoneme node using thirty eight pairs of parameters.

The parameters include nineteen pairs of cepstral parameters and nineteen pairs of cepstral differences (i.e., the differences between cepstral parameters in successive frames). The first parameter of each pair represents the mean value of the parameter for different samples of the phoneme node. The second parameter of each pair represents the variance of the values of the parameter for different samples of the phoneme node.

The processor adapts the scoring model 1505 to a particular known speaker using unsupervised training data associated with that speaker (step 1410). Unsupervised training data is produced by using speech recognition techniques to determine what the speaker said and without using an external mechanism to verify that the recognition is accurate. For example, if the speaker identification system 1100 were implemented as part of a voice messaging system, the processor would produce the unsupervised training data by recognizing the words in a message left by the speaker. By contrast, supervised training data is produced by requiring the known speaker to respond to prompts or to read from a predetermined script, by verifying the accuracy of the speech recognition and correcting any mistakes, or simply by manually transcribing the known speaker's speech.

The processor 1105 adapts phoneme nodes of the scoring model 1505 using a Bayesian adaptation approach. In particular, the processor 1105 produces an adapted parameter $P_A$ for each parameter of the phoneme node as:

$$P_A = (R*P + N_S*P_S)/(R+N_S),$$

where P is the value of the parameter from the scoring model 1505, $P_S$ is the average value of the parameter for all occurrences of the phoneme node in the speaker adaptation data, $N_S$ is the number of occurrences of the phoneme node in the speaker adaptation data, and R is a relevance count used to weight the speaker adaptation data relative to the training data. Though P typically represents thousands of samples, R generally has a value between five and ten.

Finally, the processor assigns a speaker identifier 1520 to the adapted model 1500 and stores the adapted model 1500 in the set of speech models 1130 (step 1415).

Figure 16:
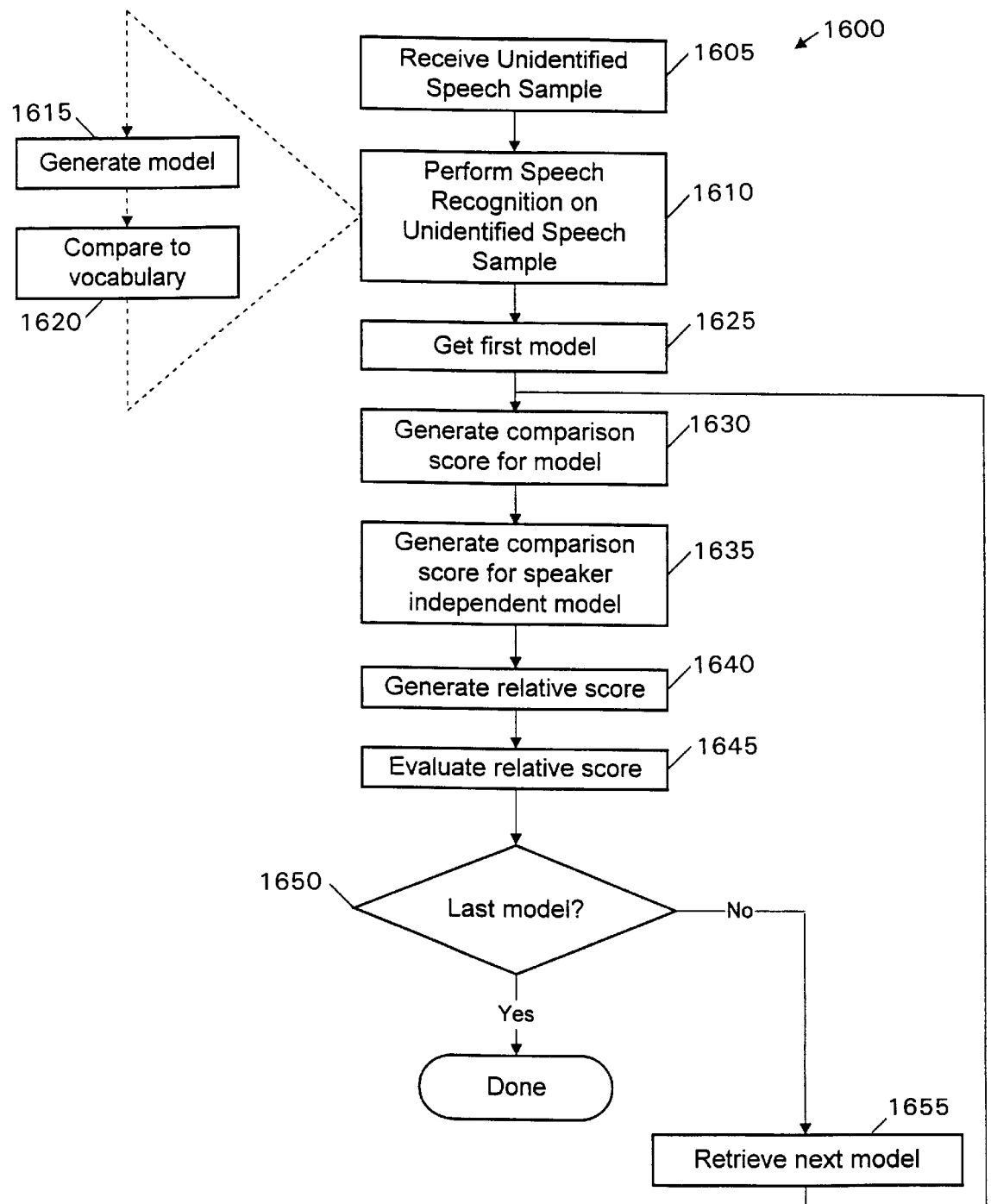

FIG. 16 illustrates a speaker identification procedure 1600 that does not include the sequential nonparametric analysis discussed above to further describe the other aspects of the system 1100. It will be recognized that the sequential nonparametric analysis may be inserted into the procedure as discussed above.

Figure 17:
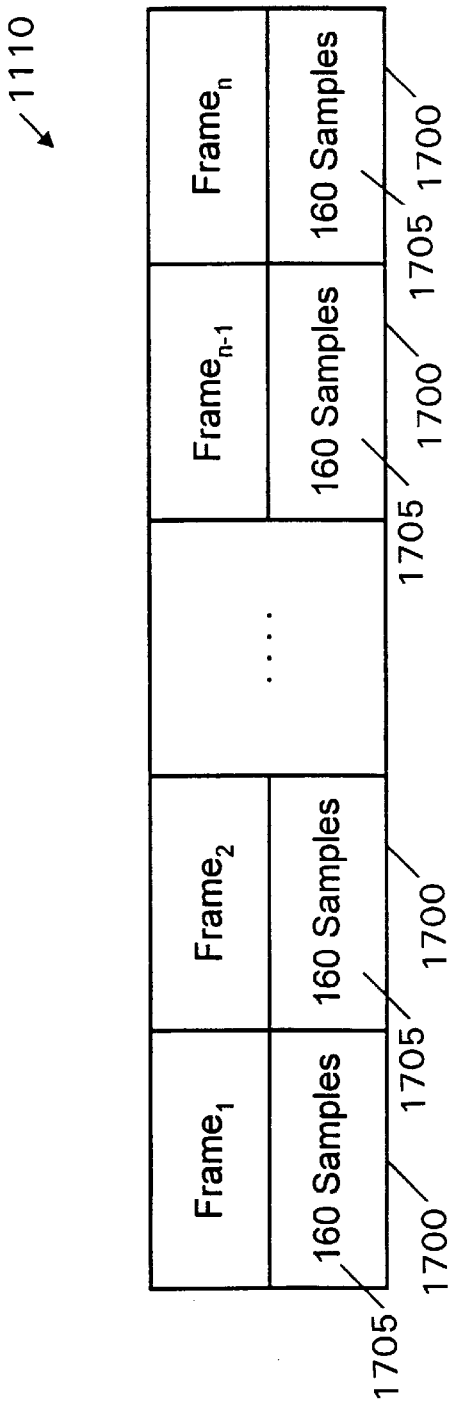
Figure 18:
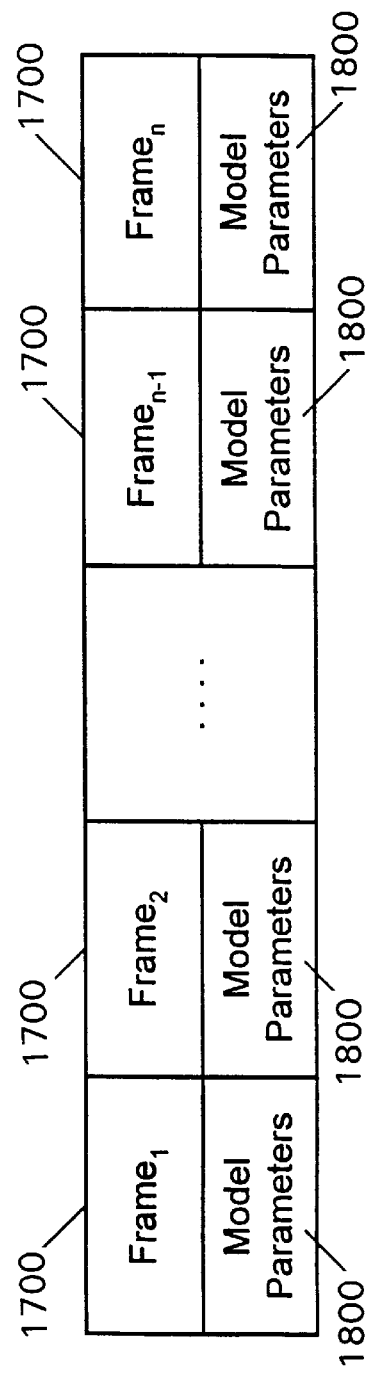

The processor begins the procedure upon receiving an unidentified speech sample 1110 (step 1605). As shown in FIG. 17, the processor 1105 receives the unidentified speech sample 1110 as sets of digital frames 1700 produced by periodically sampling an analog signal corresponding to the speech to produce a set of samples 1705 for each frame. For example, if the speaker identification system 1100 were incorporated into a voice messaging system, the unidentified speech sample would be generated by periodically sampling an analog telephone message to produce a digital signal. In particular, the digital signal would be produced using a frame length of 20 milliseconds and an analog-to-digital converter with a sampling rate of about 8 kHz so that the digital signal would include 160 digital samples 1705 in each frame 1700. The samples for each frame 1700 are then converted to frequency parameters using a Fourier transform and other techniques.

Next, the processor performs speech recognition on the unidentified speech sample 1110 (step 1610). The processor performs continuous speech recognition. This means that the speaker does not need to pause between each word in the sample 1110, and that the processor can recognize the words regardless of whether there are pauses between the words.

In performing speech recognition, the processor processes the sample 1110 to produce a sequence of frames 1115 (step 1615). As shown in FIG. 7, each frame 1700 of the sequence of frames 1115 includes a set of parameters 1800 that represent the frequency content of the frame (i.e., the energy of the frames in different frequency bands). In one implementation, the set of parameters includes twenty four parameters selected from a set of forty four parameters (eight spectral parameters, twelve cepstral parameters, twelve cepstral differences and twelve cepstral second differences) using an IMELDA transform.

The processor identifies the words that were spoken by comparing the sequence of frames 1115 to word models stored in the vocabulary 1120 (step 1620). As shown in FIG. 19, the vocabulary 1120 includes a set of words 1900. Each word 1900 is represented by a set of phonemes 1905 that represent the phonetic spelling of the word. Each phoneme 1905 is represented by three sets of model parameters 1910 that correspond to the three nodes of the phoneme. The processor identifies words in the unidentified speech sample 1110 by comparing the model parameters 1800 from the sequence of frames 1115 to the model parameters 1910 from the recognition vocabulary 1120 to find series of frames 1700 from the sequence of frames 1115 that correspond to words 1900 from the recognition vocabulary.

Figure 20:
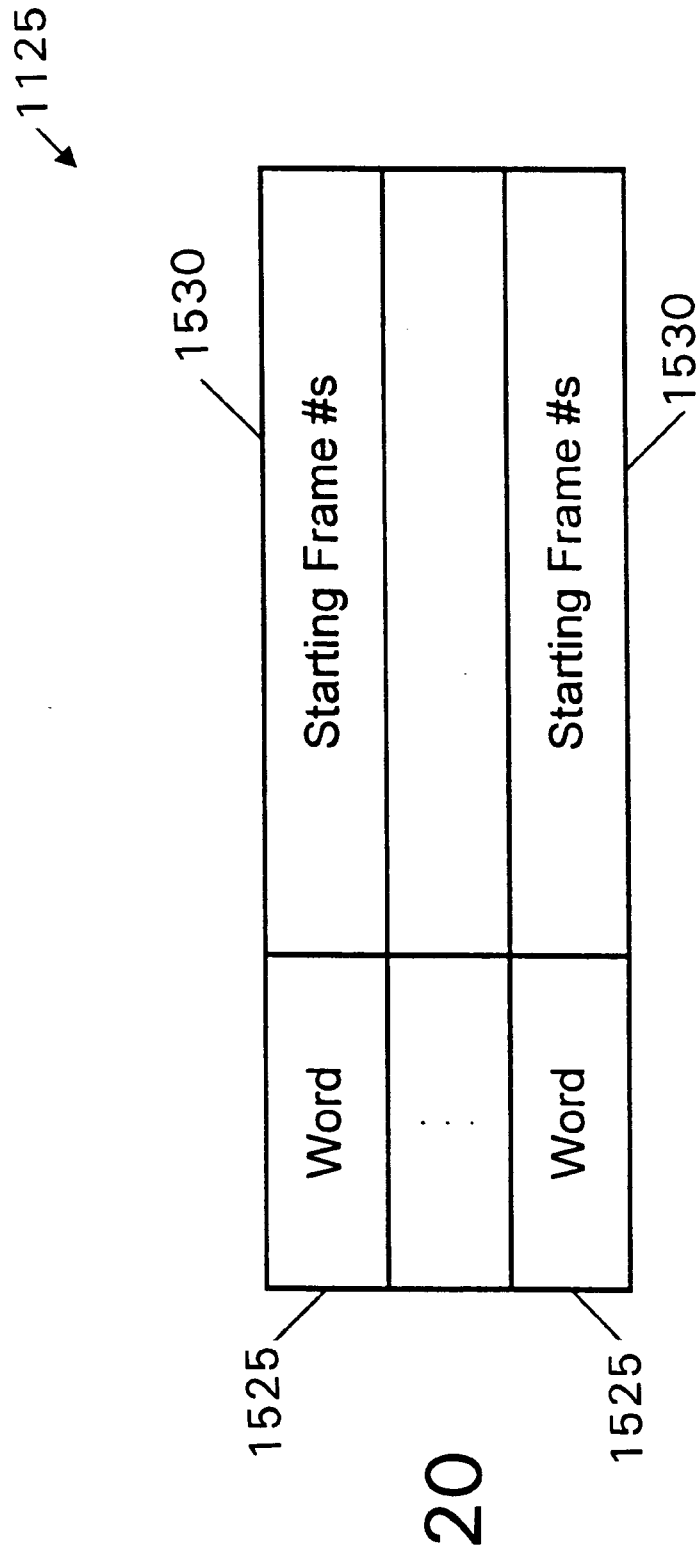

Based on the results of comparing the sequence of frames 1115 to the recognition vocabulary 1120, the processor produces the text 1125 that corresponds to the sample 1110. As shown in FIG. 20, the processor produces a time alignment of the text 1125 with the sequence of frames 1115 so that a phoneme node 2000 is associated with each frame 1700 of the sequence of frames 1115. A similar result could be obtained by associating a starting frame number with each phoneme node of the text.

After performing speech recognition, the processor retrieves the first model 1500 from the set of speech models 1130 produced by known speakers (step 1625). As shown in FIG. 15 and discussed above, each model 1500 from the set of speech models 1130 includes a speaker identifier 1520 and a set of phonemes 1510. As also discussed above, each phoneme node is represented by three sets of model parameters 1515 that may correspond to the way in which the speaker voices the three nodes of the phoneme.

The processor compares the retrieved model 1500 to the sequence of frames 1115 of the unidentified speech sample 1110. First, the processor produces a comparison score for the speaker represented by the retrieved model (step 1630). This score is the negative of the logarithm of the probability that the speaker represented by the retrieved model produced the speech represented by the sequence of frames 1115.

The processor produces the comparison score for the retrieved model 1500 by comparing each frame 1700 of the sequence of frames 1115 to model parameters 1515 from the retrieved model for the phoneme node to which the frame corresponds (as indicated by the text 1125). In particular, the processor produces a score for each frame as:

$$score_{frame} = \sum_{i=1}^{44} \frac{(f_i - p_i)^2}{\sigma_i^2},$$

where i corresponds to a particular parameter, $f_i$ is the parameter value for the frame, $p_i$ is the mean parameter value for the phoneme node, and $\sigma_i$ is the deviation of the parameter value for the phoneme node. The processor then sums the scores for all of the frames to produce a score for the node. Finally, the processor sums the scores for all nodes of an utterance to produce a score for the utterance.

Next, if the processor has not already done so, the processor produces a comparison score for the unadapted version of the scoring model 1505 (step 1635). The processor produces the comparison score for the unadapted (speaker independent) model 1505 in the same way that the processor produces the comparison score for the retrieved model 1500.

The processor then determines a relative score for the speaker represented by the retrieved model by subtracting the score for the speaker independent model from the score for the retrieved model (step 1640). Since the two scores are logarithmic values, the subtraction corresponds to division of the probabilities and the relative score corresponds to a likelihood ratio.

The subtraction accounts for background or other conditions that may affect the score. For example, if the speech represented by the sequence of frames 1115 were received over a noisy phone line, the comparison score for the retrieved model and the comparison score for the speaker independent model would be affected similarly by the noise on the phone line. Accordingly, subtraction of the scores would eliminate or reduce the effects of the noise.

The subtraction also serves to discount the effect on the score of unadapted phoneme nodes or phoneme nodes that have only been adapted by a small number of occurrences. As discussed above, the model for a particular known speaker is produced by modifying a speaker independent model based on training data generated from speech of the known speaker. As such, a phoneme node must occur in the training data for the model of the node to differ from the corresponding model in the speaker independent model, and must occur in the training data more than a few times for the model of the node to differ substantially from the corresponding model in the speaker independent model. The comparison scores for the retrieved model and the speaker independent model will be identical for frames corresponding to unadapted phoneme nodes. Accordingly, the subtraction will result in the effect of those frames being cancelled from the relative score. Similarly, the comparison scores for the retrieved model and the speaker independent model will differ only slightly for frames corresponding to slightly adapted phoneme nodes so that the subtraction will result in the effect of those frames having a reduced effect on the relative score.

Finally, the processor evaluates the relative score to determine whether the speaker associated with the retrieved model is likely to have produced the speech corresponding to the sample 1110 (step 1645). In an open set identification system, there may be more than one speaker who is likely to have produced the speech corresponding to the sample 1110.

In one approach to evaluating the score, the relative score is normalized to compensate for differences in the amount of adaption data available for each speaker.

This normalization process produces a normalized score that then may be used to indicate the likelihood that the known speaker corresponding to the retrieved model was the speaker who produced the speech sample 1110. For example, the score may be normalized using so-called Z-normalization in which a first calibration factor is subtracted from the score and the result is divided by a second calibration factor. The calibration factors may be produced by computing the scores produced using a set of utterances from a set of speakers used for calibration and designating the first calibration factor as the mean value of the scores and the second calibration factor as the standard deviation of the scores. The relative score may be further modified in view of results of a sequential nonparametric analysis, as discussed above.

In a closed set identification system, the relative score may be evaluated by maintaining the score of the best-scoring model and using that score in evaluating each successive model. After the models for all known speakers are evaluated, the speaker corresponding to the model having the best score could be selected as being the speaker who produced the speech sample 1110.

After evaluating the relative score, the processor determines whether the retrieved model is the last model in the set of models 1130 (step 1650). If not, then the processor retrieves the next model from the set of models 1130 (step 1655) and repeats the process of comparing that retrieved model with the sequence of frames 1115 of the unidentified speech sample (steps 1630–1650). The processor continues this process until all of the models from the set of models 1130 have been evaluated.

When the evaluation of the relative score clearly indicates that one known speaker produced the speech sample 1110, the processor may use the sequence of frames 1115 and the text 1125 of the speech sample 1110 to update the speech model for the identified speaker.

Figure 21:
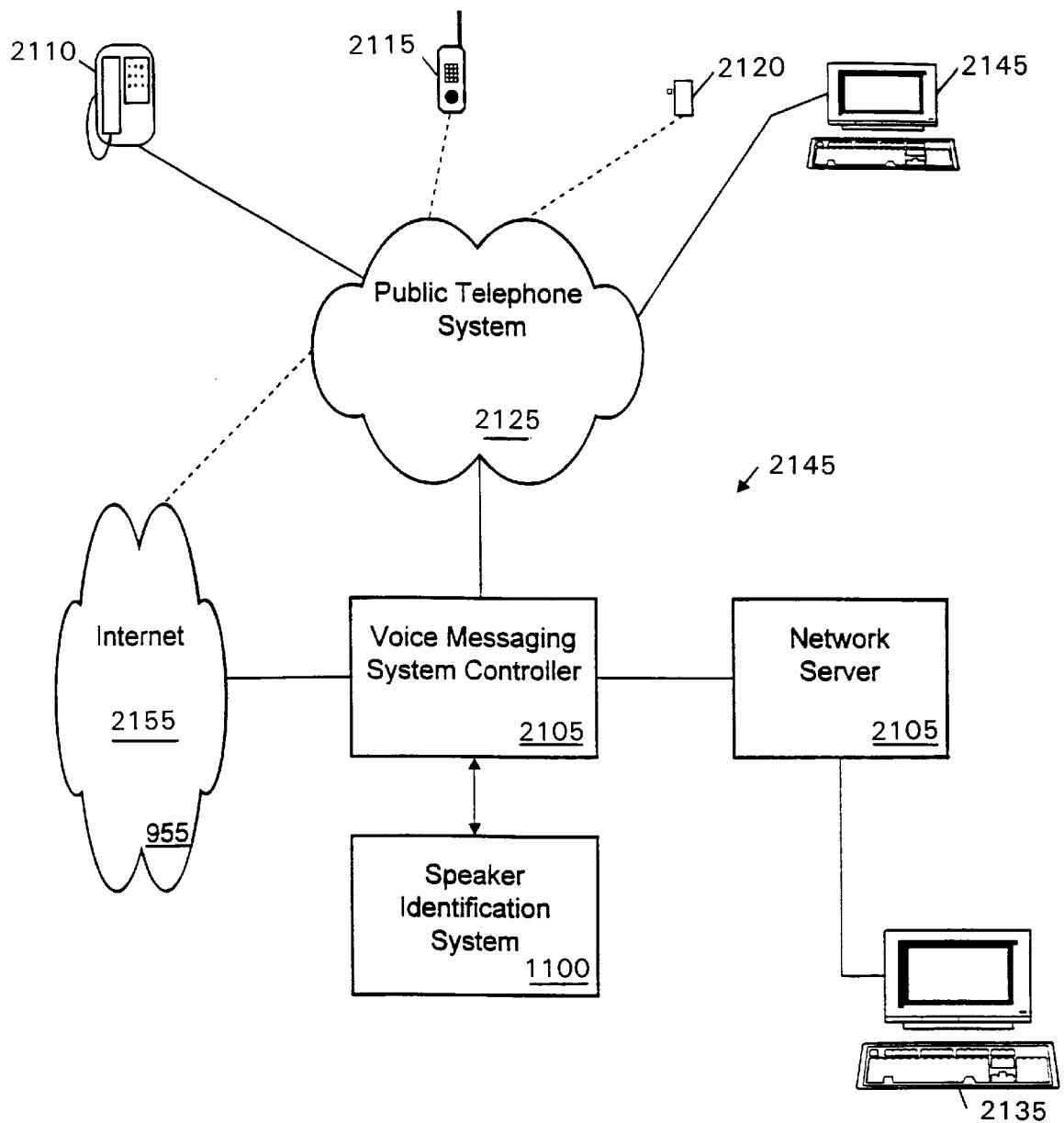
FIG. 21 is a block diagram of a voice messaging system including the speaker identification system of FIG. 11.

Referring to FIG. 21, the speaker identification system 1100 may be implemented in a voice messaging system 2100 to provide a user with the likely identity of a person who has left messages for the user. This identity could be used to prioritize messages based on the source of the messages, or to take other actions. For example, a user of the voice messaging system 2100 could configure a controller 2105 of the system to call the user's home telephone 2110, portable telephone 2115, pager 2120 or some other telephone number when a message is received from a particular person (e.g., a supervisor or an important customer). To this end, the controller 2105 is connected to the public telephone network 2125 through a suitable telephone connection 2130.

The user also could configure the controller to send an electronic mail message to the user's office computer 2135 through a network server 2140, or to the user's home computer 2145 through the telephone connection 2130 or a connection 2150 to the Internet 2155. The electronic mail message would notify the user that a message has been received, identify the source of the message, and, in some instances, provide the text of the message or an audio file including the message itself.

Upon reviewing a message, the user could indicate to the system whether the system correctly identified the speaker. If the system did not correctly identify the speaker, or if the system was unable to identify the speaker who produced a particular message, the user could provide the system with the identity of the speaker after reviewing the message. The system could then adapt a speech model for the speaker based on the contents of the message. This provides the voice messaging system with the ability to adapt so that the system's ability to identify speakers will improve with time.

The speaker identification system 100 also may be used to identify the user of a speech recognition system. The performance of a speech recognition system may be improved by using speaker-dependent speech models. In some applications, such as, for example, medical transcription systems, a speech recognition system may be used by a variety of different speakers. Care must be taken to ensure that a user has been identified properly so that an appropriate model is used.

The speaker identification system 1100 may be used to permit a user to use the speech recognition system without first providing his or her identity. In one implementation, a speaker-independent speech model would be employed when a user begins to use the speech recognition system and the speaker identification system would be run as a background process. Upon determining the identity of the user, the speaker identification system would instruct the speech recognition system to switch to an appropriate speaker-dependent speech model. If desired, the speech recognition system could indicate to the user that the user has been identified and permit the user to correct any identification error.

Other embodiments are within the scope of the following claims. For example, in both speech recognition and speaker identification, the sequential nonparametric analysis may be used only to make fine distinctions. For example, in speech recognition, the analysis could be used when the difference between the scores for the top two entries in an n-best list is less than a threshold amount. For a given amount of processing capacity, making limited use of the sequential nonparametric analysis would permit larger amounts of data to be used when the analysis is applied.

The sequential nonparametric analysis also may be used in conjunction with confidence measures. Confidence measures are produced by the speech recognizor and provide an indication of the recognizor's confidence in different portions of a time alignment. The sequential nonparametric analysis may employ the confidence measures by weighing more heavily phonemes for which the recognizor has expressed a high level of confidence.

The techniques also may be used in language identification applications. One approach to language identification uses recognizors configured to recognize different languages. For example, a first recognizor may be configured to recognize English while a second recognizor is configured to recognize French. A speech sample is provided to the different recognizors and the likelihood that the speech sample was spoken in a particular language is determined based on the score produced by the recognizor associated with that language. Sequential nonparametric techniques may be used in language identification to compare a speech sample to samples of speech spoken by native speakers of different languages.

What is claimed is:

1. A method of evaluating a speech sample using a computer, the method comprising:
   receiving training data comprising samples of speech;
   storing the training data along with identification of speech elements to which portions of the training data are related;
   receiving a speech sample;
   performing speech recognition on the speech sample to produce recognition results; and
   evaluating the recognition results in view of the training data and the identification of the speech elements to which the portions of the training data are related, wherein:
      performing speech recognition on the speech sample comprises identifying portions of the speech sample to which different speech elements correspond; and
      evaluating the recognition results comprises comparing a portion of the speech sample identified as corresponding to a particular speech element to one or more portions of the training data identified as corresponding to the particular speech element.

2. The method of claim 1, further comprising analyzing the training data to designate different portions of the training data as being related to different speech elements.

3. The method of claim 2, wherein analyzing the training data comprises performing large vocabulary continuous speech recognition on the training data to produce training data recognition results and a training data time alignment, the training data recognition results including a sequence of speech elements and the training data time alignment identifying portions of the training data to which each speech element corresponds.

4. The method of claim 1, wherein comparing comprises directly comparing the portion of the speech sample to a particular speech sample from the training data.

5. The method of claim 1, wherein performing speech recognition on the speech sample to produce recognition results comprises producing speech sample recognition results and a speech sample time alignment, the speech sample recognition results including a sequence of speech elements and the speech sample time alignment identifying portions of the speech sample to which each speech element corresponds.

6. The method of claim 1, wherein evaluating the recognition results comprises evaluating accuracy of the recognition results.

7. The method of claim 6, wherein the recognition results comprise an ordered list of hypotheses about contents of the speech sample, and wherein evaluating the recognition results comprises reordering the list as a result of the evaluated accuracy of each hypothesis.

8. The method of claim 1, wherein the training data are associated with a known speaker and evaluating the recognition results comprises determining a likelihood that the known speaker produced the speech sample.

9. The method of claim 1, wherein the training data are associated with different known speakers and evaluating the recognition results comprises determining which of the known speakers is more likely to have produced the speech sample.

10. The method of claim 1, wherein the training data are associated with a known language and evaluating the recognition results comprises determining a likelihood that the speech sample was spoken in the known language.

11. The method of claim 1, wherein the recognition results identify speech elements to which different portions of the speech sample correspond and evaluating the recognition results comprises comparing a portion of the speech sample identified as corresponding to a particular speech element to one or more portions of the training data identified as corresponding to the particular speech element.

12. The method of claim 11, wherein evaluating the recognition results comprises:
   selecting a speech element from the recognition results;
   comparing a portion of the speech sample corresponding to the selected speech element to a portion of the training data identified as corresponding to the selected speech element;
   generating a speech element score as a result of the comparison;
   repeating the selecting, comparing and generating steps for each speech element in the recognition results; and
   producing an evaluation score for the recognition results based on the speech element scores for the speech elements in the recognition results.

13. The method of claim 12, wherein the compared portion of the speech sample and the compared portion of the training data are each represented by frames of data and wherein comparing the portions comprises aligning the frames of the portions using a dynamic programming technique that seeks to minimize an average distance between aligned frames.

14. The method of claim 13, wherein generating the speech element score comprises generating the score based on distances between aligned frames.

15. The method of claim 12, wherein producing the evaluation score for the recognition results comprises producing the evaluation score based on a subset of the speech element scores.

16. The method of claim 15, wherein producing the evaluation score for the recognition results comprises producing the evaluation score based on a best-scoring subset of the speech element scores.

17. The method of claim 12, further comprising normalizing the evaluation score.

18. The method of claim 17, wherein normalizing the evaluation score comprises:
receiving cohort data, the cohort data comprising samples of speech for a cohort of speakers;
storing the cohort data along with identification of speech elements to which portions of the cohort data are related;
evaluating the recognition results in view of the cohort data and the identification of the speech elements to which the portions of the cohort data are related to produce a cohort score; and
modifying the evaluation score based on the cohort score.

19. The method of claim 1, wherein performing speech recognition comprises performing large vocabulary continuous speech recognition.

20. The method of claim 1, wherein the training data comprises individual speech samples, each of which represents a single speech element uttered by a single speaker.

21. The method of claim 20, wherein evaluating recognition results comprises directly comparing the speech sample to individual speech samples from the training data corresponding to speech elements identified by the recognition results.

22. A computer program, residing on a computer readable medium, for a system comprising a processor and an input device, the computer program comprising instructions for evaluating a speech sample by causing the processor to perform the following operations:
receive training data comprising samples of speech;
store the training data along with identification of speech elements to which portions of the training data are related;
receive a speech sample;
perform speech recognition on the speech sample to produce recognition results; and
evaluate the recognition results in view of the training data and the identification of the speech elements to which the portions of the training data are related,
wherein:
analyzing the training data comprises identifying portions of the training data to which different speech elements correspond;
performing speech recognition on the speech sample comprises identifying portions of the speech sample to which different speech elements correspond; and
evaluating the recognition results comprises comparing a portion of the speech sample identified as corresponding to a particular speech element to one or more portions of the training data identified as corresponding to the particular speech element.

23. The computer program of claim 20, further comprising instructions for causing the processor to analyze the training data to designate different portions of the training data as being related to different speech elements.

24. The computer program of claim 22, wherein the training data are associated with a known speaker and evaluating the recognition results comprises determining a likelihood that the known speaker produced the speech sample.

25. The computer program of claim 22, wherein the training data are associated with different known speakers and evaluating the recognition results comprises determining which of the known speakers is more likely to have produced the speech sample.

26. The computer program of claim 22, wherein the training data are associated with a known language and evaluating the recognition results comprises determining a likelihood that the speech sample was spoken in the known language.

27. The computer program of claim 22, wherein evaluating the recognition results comprises evaluating accuracy of the recognition results.

* * * * *